United States Patent
Ito et al.

(10) Patent No.: US 8,314,860 B2
(45) Date of Patent: Nov. 20, 2012

(54) RECORDING MEDIA CONTROL APPARATUS, RECORDING MEDIA CONTROLLING METHOD, AND COMPUTER PROGRAM

(75) Inventors: Ryogo Ito, Tokyo (JP); Hiroshi Shimono, Tokyo (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 12/425,543

(22) Filed: Apr. 17, 2009

(65) Prior Publication Data

US 2009/0316007 A1 Dec. 24, 2009

(30) Foreign Application Priority Data

Jun. 24, 2008 (JP) ................... 2008-164058

(51) Int. Cl.
*H04N 5/76* (2006.01)
(52) U.S. Cl. ......... 348/231.99; 348/207.11; 348/207.99; 348/207.1; 348/231.9
(58) Field of Classification Search .......... None
See application file for complete search history.

(56) References Cited

U.S. PATENT DOCUMENTS

2007/0146923 A1* 6/2007 Imai et al. ................. 360/69

FOREIGN PATENT DOCUMENTS

| JP | 9-168109 | 6/1997 |
|---|---|---|
| JP | 10-340521 | 12/1998 |
| JP | 2001-21420 | 1/2001 |
| JP | 2002-259064 | 9/2002 |
| JP | 2004-24551 | 1/2004 |
| JP | 2007-179662 | 7/2007 |
| JP | 2008-59652 | 3/2008 |

* cited by examiner

*Primary Examiner* — Chieh M Fan
*Assistant Examiner* — Angel L Garces-Rivera
(74) *Attorney, Agent, or Firm* — Oblon, Spivak, McClelland, Maier & Neustadt, L.L.P.

(57) ABSTRACT

A recording media control apparatus is disclosed which includes: a host interface configured to connect recording media to a recording media unit, the recording media being subject to the writing and reading of data thereto and therefrom, the recording media unit incorporating an internal temperature sensor; an access request section configured to make either a data write request or a data read request to the recording media unit; a temperature status determination section configured to request temperature acquisition from the recording media unit in a predetermined cycle and, based on the acquired temperature, to determine temperature status of the recording media; and an access control section configured to transmit a command to the recording media unit via the host interface in response to an access request from the access request section and the temperature acquisition request from the temperature status determination section.

9 Claims, 16 Drawing Sheets

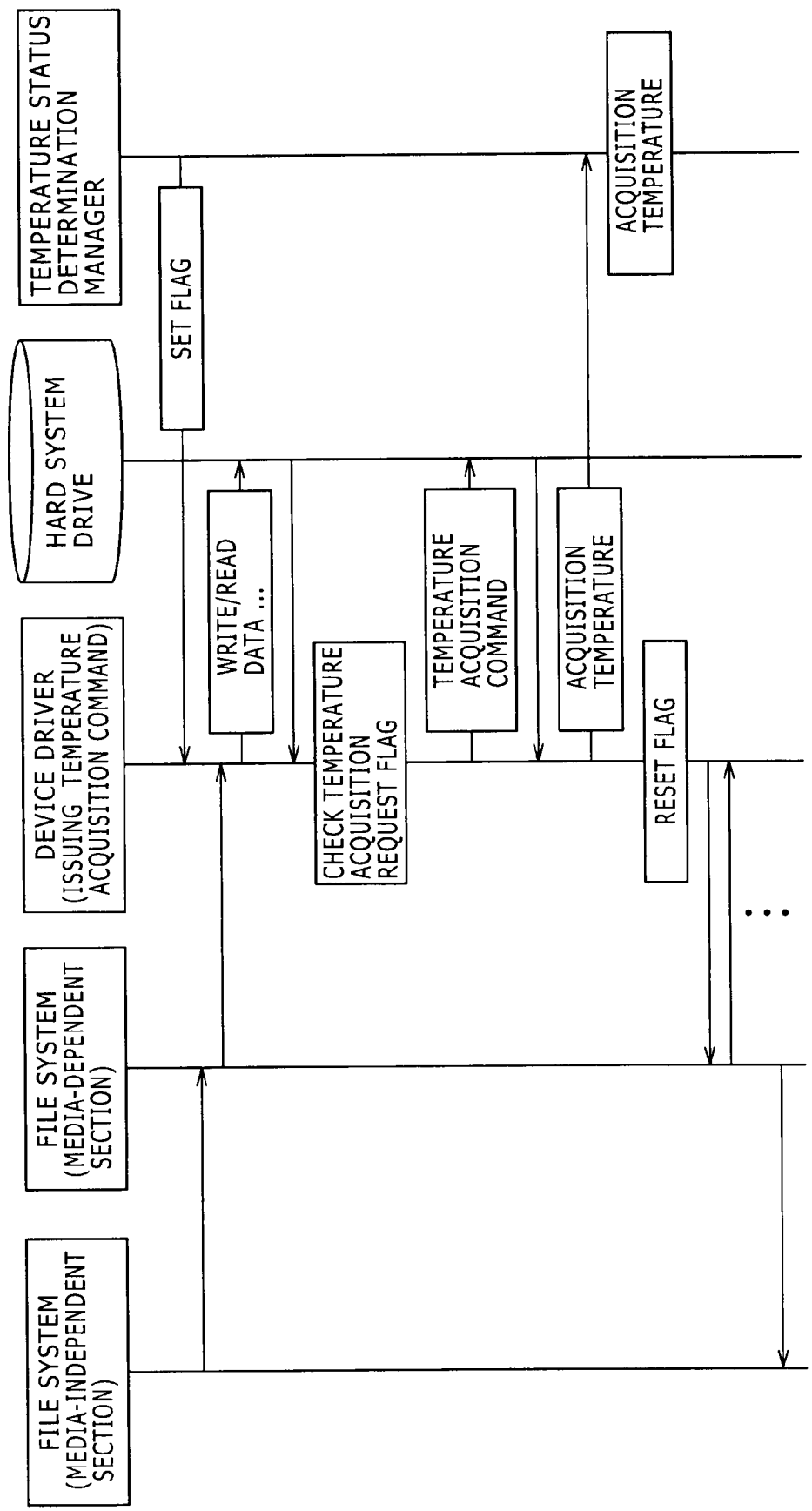

FIG. 7

| CURRENT TEMPERATURE STATUS | TEMPERATURE STATUS AFTER TRANSITION ||||||
|---|---|---|---|---|---|
| | | HIGH TEMPERATURE | PRE-HIGH TEMPERATURE | ROOM TEMPERATURE | PRE-LOW TEMPERATURE | LOW TEMPERATURE |
| HIGH TEMPERATURE | B OR HIGHER | | | | |
| PRE-HIGH TEMPERATURE | A OR HIGHER | LOWER THAN A, B OR HIGHER | LOWER THAN B, D OR HIGHER | LOWER THAN D | LOWER THAN C |
| ROOM TEMPERATURE | | | | | |
| PRE-LOW TEMPERATURE | | | LOWER THAN B, D OR HIGHER | LOWER THAN D | LOWER THAN C |
| LOW TEMPERATURE | | | | | |

RECORDING MEDIA CONTROL APPARATUS, RECORDING MEDIA CONTROLLING METHOD, AND COMPUTER PROGRAM

BACKGROUND OF THE INVENTION

1. Field of the Invention

The present invention relates to a recording media control apparatus, a recording media controlling method, and a computer program. More particularly, the invention relates to a recording media control apparatus, a recording media controlling method, and a computer program for controlling the performance of recording media such as hard disks that can be randomly accessed by a read/write head doing seeks on their recording surface.

2. Description of the Related Art

Furthermore, the present invention relates to a recording media control apparatus, a recording media controlling method, and a computer program for protecting recording media from the environment of high and low temperatures by controlling the operations of recording and reproduction to and from the media in keeping with changes in the temperature environment. More specifically, the invention relates to a recording media control apparatus, a recording media controlling method, and a computer program for controlling the recording and reproduction to and from recording media in conformance with the temperature environment through the use of a temperature sensor built in a recording media unit.

Along with the development of information technology covering information processing and data communication has emerged the need to reuse information created or edited in the past. This trend has lent growing importance to information storage technology. To date, information recording devices utilizing diverse media such as magnetic tapes and magnetic disks have been developed and popularized. Of these, disk-type recording media such as hard disks basically permit random access by a read/write head doing seeks in the radial direction over the recording surface of a rotating disk.

Hard disks have already gained widespread acceptance. For example, the hard disk is employed in standard local recording devices for use with personal computers, the hard disk accommodating an operating system (OS), applications and other diverse software which have been installed with a view to starting up and operating the computer, as well as various data files that have been created or edited.

Information apparatuses handling large amounts of data such as digital video cameras have come to utilize hard disks as local recording devices or externally connected recording devices (e.g., see Japanese Patent Laid-open Nos. Hei 8-140027 and Hei 9-168109). The hard disk, when used in the recording device for the digital video camera, permits digital recording of the data constituting numerous high-quality pictures and allows random access to the data recorded thereon. Also, the hard disk-equipped digital video camera may be connected to a computer for the handling of files and the editing of pictures on the latter. Recently, hard disk drives have been incorporated in devices designed primarily for portable use such as in portable music players, as well as in devices mounted on mobile units such as navigation devices. Using the hard disk in any of these information apparatuses translates into lower weight, smaller volume, and less manufacturing cost of the apparatus in question than if removable magnetic tapes or optical disks were utilized. In addition, not limited by the size of the recording media or by the layout of mounting arrangements, the apparatus can be reduced in size and thereby offers a higher degree of flexibility in design.

The hard disk drive utilizes techniques for creating an air space between a magnetic head and a magnetic disk by rotating the disk, thereby floating the magnetic head slightly over the disk coated or vapor-deposited with a magnetic substance. That is, while the magnetic disk is at rest, the magnetic head remains lightly in contact with the magnetic disk surface. As the magnetic disk is rotated, the resulting air flow causes the magnetic head to float over the disk surface for write or read operations. The magnetic disk and the magnetic head stay close to yet detached from each other, whereby high-density magnetic recording is implemented.

The above-mentioned mechanism turns the hard disk drive into a recording apparatus vulnerable to shock. Various arrangements are thus needed to avoid physical contact between the magnetic disk and the magnetic head. For example, one known arrangement involves using an acceleration sensor to detect a fall of the apparatus incorporating the hard disk drive. Before an imminent impact of the apparatus on the ground, the magnetic head is retracted so as to protect the hard disk.

In an environment where the internal temperature of the apparatus is extremely low, getting the disk to start up and rotate can generate abnormal sound in a resonance mode different from what is in effect at room temperature. Or it is feared that at the time of contact (CSS: contact start stop) between the recording surface of the disk and the magnetic head, an increasing viscosity of a lubricant in use will give rise to an increase in abrasion resistance. For these reasons, the countermeasures above against shock need to be supplemented by arrangements for protecting the hard disk from high and low temperatures while recording and reproduction to and from the disk are being controlled. In particular, portable devices such as digital video cameras employing an internal hard disk are expected to be used frequently outdoors or in an environment of severe temperature characteristics such as cold regions. This further increases the need for controlling disk access operations in keeping with the temperature being detected.

Illustratively, a recording and reproducing apparatus and a method for controlling it have been proposed whereby the internal temperature of an incorporated disk drive is detected so that if the detected temperature is below a predetermined level, the disk drive is inhibited from accessing its disk-like recording media (e.g., see Japanese Patent Laid-open No. Hei 10-340521). The operation of the disk drive is thus suppressed at low temperatures to avoid its damage or destruction, and the temperature of the disk drive is raised quickly to room temperature to ensure reliable performance. The proposed apparatus and method envisage guaranteeing the performance of the hard disk drive within a predetermined temperature range.

In order to implement the control of recording and reproduction in keeping with the temperature environment, it is preferred to measure the temperature of the hard disk drive as accurately as possible. The reason is that a failure to detect the state where the temperature is low enough to trigger the suppression of access operations can lead to malfunction or a device fault, and that a failure to detect the state where the temperature is high enough to warrant the resumption of access operations can bring about reduced service because of unnecessarily inhibited access.

There are two major methods for measuring the temperature of the hard disk drive: by using a temperature sensor attached externally to the drive unit, or by resorting to a temperature sensor placed inside the drive unit. Needless to say, the second method permits more accurate measurement of the temperature.

With regard to the second method above, a disk drive has been proposed which incorporates a temperature sensor and which is instructed to start and stop depending on the change detected by the sensor in the internal temperature (e.g., see Japanese Patent Laid-open No. 2007-179662). Also proposed is an information processing apparatus which incorporates a plurality of hard disk drives and which has a temperature sensor installed close to a seek motor inside the preferentially utilized drive unit (e.g., see Japanese Patent Laid-open No. 2008-59652). Another proposal involves an information processing apparatus which uses both a temperature sensor attached externally to a hard disk unit and a temperature sensor incorporated inside the unit so as to protect the hard disk from high and low temperatures (e.g., see Japanese Patent Application No. 2007-194443 having been assigned to this applicant).

As mentioned above, the acceleration sensor has been used to protect the disk from shock. Some of the currently available acceleration sensors incorporate temperature sensors. (For example, Japanese Patent Laid-open No. 2004-24551 proposes a semiconductor device wherein sensors including a temperature sensor, an acceleration sensor, and red light/infrared light sensors are formed on a single semiconductor substrate.)

The inventors are of the opinion that the setup having the temperature sensor incorporated in the drive unit is preferable for two reasons: because an acceleration sensor with no temperature sensor placed inside is inexpensive, and because the temperature sensor inside the drive unit permits more accurate temperature measurement.

Also, the inventors believe that the measures to protect recording media against temperatures should preferably be taken in keeping with the performance status of the host incorporating the hard disk drive, in such a manner as not to hamper normal operations including the writing and reading of data to and from the disk which are carried out by the host.

The control over detection and monitoring of temperatures in the hard disk may be performed primarily by one of two methods: by the host, or by the drive unit on an autonomous basis. According to the first method, the host may issue a temperature acquisition request command to the hard disk and, given a return value therefrom, may control the detection and monitoring of temperatures accordingly. The second method is not very practical for common apparatuses utilizing hard disk drives because of the need to implement additional arrangements whereby the host would notify the hard disk drive of its own performance status.

Even with the first method above, an inordinately short cycle in which the host requests temperature acquisition can lead to excess overhead in the process of reading and writing data and, it is feared, to reduced performance. Conversely, an excessively long cycle in which the host requests temperature acquisition can make it impossible to control recording and reproduction quickly enough in keeping with temperature changes for protection against temperature fluctuations. That in turn makes it impossible to prevent a hard disk error or destruction.

SUMMARY OF THE INVENTION

The preferred embodiments of the present invention have been made in view of the above circumstances and provides a recording media control apparatus, a recording media controlling method, and a computer program for controlling read and write operations on a recording media unit in keeping with ambient temperature changes and thereby protecting recording media from the environment of high and low temperatures.

The present embodiments also provide a recording media control apparatus, a recording media controlling method, and a computer program for controlling read and write operations on a recording media unit in keeping with the temperature environment using an internal temperature sensor placed inside the recording media unit.

The embodiments further provide a recording media control apparatus, a recording media controlling method, and a computer program for controlling read and write operations on a recording media unit in keeping with the temperature environment by issuing a temperature acquisition request to the recording media unit in a suitably timed manner.

In carrying out the present invention and according to one embodiment thereof, there is provided a recording media control apparatus including: a host interface configured to connect recording media to a recording media unit, the recording media being subject to the writing and reading of data thereto and therefrom, the recording media unit incorporating an internal temperature sensor; an access request section configured to make either a data write request or a data read request to the recording media unit; a temperature status determination section configured to request temperature acquisition from the recording media unit in a predetermined cycle and, based on the acquired temperature, to determine temperature status of the recording media; and an access control section configured to transmit a command to the recording media unit via the host interface in response to an access request from the access request section and the temperature acquisition request from the temperature status determination section.

Randomly accessible recording media such as hard disks have been popularized extensively. They are used not only in computing systems such as personal computers but also in portable information apparatuses including digital cameras.

The hard disk has a mechanism with its magnetic head floated over the disk surface by the flow of air generated by the rotating magnetic disk. For that reason, the mechanical performance of the hard disk can be easily affected by changes in temperature; the hard disk needs to be protected from the environment of high and low temperatures while being controlled in recording and reproduction. An internal temperature sensor, placed inside the drive unit, is considered to permit accurate acquisition of the temperature inside the unit, which will contribute to implementing appropriate measures against temperature fluctuations.

A host that incorporates a temperature-sensitive recording media unit such as the hard disk needs to effect a temperature acquisition request in a suitably timed manner. Otherwise, it is feared, the host could be late in writing and reading data to and from the recording media or could fail to keep track of and counter temperature fluctuations of the recording media adequately.

The recording media control apparatus according to an embodiment of the present invention connects a recording media unit incorporating an internal temperature sensor to the host illustratively via a general host interface such as ATA (AT Attachment). Through the host interface, data is written and read to and from the recording media unit and also a temperature acquisition request command is transmitted to the unit. The recording media unit is then controlled in recording and reproduction in accordance with the return value given in response to the temperature acquisition command, whereby the recording media are protected from the environment of high and low temperatures.

The recording media control apparatus of the above embodiment of the present invention is primarily characterized in that it controls the cycle in which to transmit the temperature acquisition command in keeping with the current temperature status of the recording media. The recording media control apparatus thus processes data read and data write commands efficiently while adapting to the temperature environment.

Specifically, based on the temperature acquired from the recording media unit, the temperature status determination section may determine the temperature status of the recording media. If the recording media are found to be in a room temperature state, then the temperature status determination section may select a first cycle as the longest cycle in which to request temperature acquisition. If the recording media are found to have effected transition to either a high temperature state or a low temperature state, then the temperature status determination section may select a second cycle as the shortest cycle in which to perform temperature detection and monitoring control. If the recording media are found to be either in a pre-high temperature state between the room temperature state and the high temperature state, or in a pre-low temperature state between the room temperature state and the low temperature state, then the temperature status determination section may select a third cycle that comes between the first and the second cycles as the cycle in which to request temperature acquisition. In this manner, the cycle in which to request temperature acquisition may be changed in more detailed steps.

When the cycle in which to request temperature acquisition is controlled in accordance with temperature status as outlined above, it is possible to reduce the risk of lowering the rate at which to write or read data to or from the recording media in the temperature environment.

Meanwhile, the process between the transition of the recording media from the room temperature state to the high or low temperature state on the one hand, and the transition from the high or low temperature state to the room temperature state on the other hand, is not reversible. Once the high or low temperature state is reached, hysteresis is considered to intervene before the recording media return to the initial state. Thus the temperature status determination section determines temperature status by considering the hysteresis effect, whereby the control of temperature detection and monitoring is carried out more appropriately.

Specifically, upon temperature rise from the room temperature state, the temperature status determination section effects transition to the pre-high temperature state when the temperature exceeds a pre-high temperature threshold value (B) and to the high temperature state when the temperature exceeds a high temperature threshold value (A). Upon temperature drop from the high temperature state back to the room temperature state, the temperature status determination section stays in the high temperature state even when the temperature falls below the high temperature threshold value (A) and returns to the room temperature state when the temperature drops below the pre-high temperature threshold value (B). That is, once it effects transition to the high temperature state, the temperature status determination section maintains the second cycle as the shortest cycle in which to request temperature acquisition until the temperature drops to the room temperature state past the pre-high temperature threshold value (B), whereby ambient temperature fluctuations are more rigorously monitored.

Upon temperature drop from the room temperature state, the temperature status determination section effects transition to the pre-high temperature state when the temperature drops below a pre-low temperature threshold value (D) and to the low temperature state when the temperature drops below a low temperature threshold value (C). Upon temperature rise from the low temperature state back to the room temperature state, the temperature status determination section stays in the low temperature state even when the temperature exceeds the low temperature threshold value (C) and returns to the room temperature state when the temperature exceeds the pre-low temperature threshold value (D). That is, once it effects transition to the low temperature state, the temperature status determination section maintains the second cycle as the shortest cycle in which to request temperature acquisition until the temperature rises to the room temperature state past the pre-low temperature threshold value (D), whereby ambient temperature fluctuations are more rigorously monitored.

The recording media control apparatus of the embodiment of the present invention is further characterized in that besides controlling the cycle in which to transmit the temperature acquisition command in keeping with the current temperature state of the recording media, the recording media control apparatus controls when to issue the temperature acquisition command in accordance with the current operation status of the recording media unit so as to process efficiently the command for writing or reading data to or from the recording media. That is, in accordance with the processing status of either a data write command or a data read command issued to the recording media unit based on the request from the access request section, the access control section may control when to transmit a temperature acquisition command based on the request from the temperature status determination section.

Illustratively, the recording media unit may include a cache in which to store write data temporarily, and a capability of writing the data stored in the cache to the recording media in response to a flash cache command. When large quantities of data such as a moving picture stream are to be recorded, the recording media unit does not write data successively to the recording media every time a data write command is received but stores the data temporarily into the cache. Upon receipt of a periodically issued flash cache command, the recording media unit writes the data from the cache to the recording media, thereby completing the series of write processes.

During the recording of large quantities of data such as a moving picture stream to the recording media, the access control section may control the timing at which to transmit the temperature acquisition command in such a manner that the command is transmitted not at the end of the processing of the data write command but upon completion of the processing of the flash cache command. This makes it possible to acquire temperature measurements from the recording media in an appropriate cycle while reducing the frequency with which to issue the temperature acquisition command.

Another example in which large quantities of data are written to the recording media unit is a full format process performed on the recording media. If the issuance of a temperature acquisition command intervenes during continuous data write operations of the full format process, the processing time will be prolonged by the time period required for the issuance of the command. According to the embodiment, the timing at which to transmit the temperature acquisition command is controlled in such a manner that the command is transmitted not at the end of the processing of the data write command but upon completion of the processing of the flash cache command. In this manner, the adverse effects on the time required to perform the full format process can be minimized by reducing the frequency with which to issue the temperature acquisition command.

While large quantities of data such as a moving picture stream are being read from the recording media unit for moving picture reproduction, the recording media control apparatus of the present embodiment may issue the temperature acquisition command only in response to the request from a moving picture reproduction application. The recording media control apparatus repeats a data read cycle in which to start and stop reading data alternately depending on the amount of data stored in a read data storage buffer. Thus the timing at which to transmit the temperature acquisition command may be determined in such a manner that the command is transmitted only in response to the moving picture reproduction application signaling the stop of a data read operation. This also makes it possible to acquire temperature measurements from the recording media in an appropriate cycle while reducing the frequency with which to issue the temperature acquisition command.

According to another embodiment of the present invention, there is provided a computer program described in a computer-readable format for execution by a computer connecting recording media via a host interface to a recording media unit incorporating an internal temperature sensor, the computer program causing the computer to perform data write and data read operations on the recording media unit in accordance with temperature status thereof, the computer program including the steps of causing the computer to function with capabilities including: an access request section configured to make either a data write request or a data read request to the recording media unit; a temperature status determination section configured to request temperature acquisition from the recording media unit in a predetermined cycle and, based on the acquired temperature, to determine temperature status of the recording media; and an access control section configured to transmit a command to the recording media unit via the host interface in response to an access request from the access request section and the temperature acquisition request from the temperature status determination section.

The computer program embodying the present invention as outlined above is defined as a computer-readable program designed to cause the computer to execute intended processes. In other words, the inventive computer program installed in the computer allows its capabilities to work together to provide the same effects as those of the recording media control apparatus embodying the invention as outlined earlier.

The embodiments of the present invention thus provide a recording media control apparatus, a recording media controlling method, and a computer program for controlling read and write operations on a recording media unit in keeping with ambient temperature changes and thereby protecting recording media from the environment of high and low temperatures.

The present embodiments also provide a recording media control apparatus, a recording media controlling method, and a computer program for controlling read and write operations on a recording media unit in keeping with the temperature environment using an internal temperature sensor placed inside the recording media unit.

The embodiments further provide a recording media control apparatus, a recording media controlling method, and a computer program for controlling read and write operations on a recording media unit in keeping with the temperature environment by issuing a temperature acquisition request to the recording media unit in a suitably timed manner.

According to the embodiments of the present invention, it is possible to acquire temperature measurements efficiently from an internal temperature sensor placed in the recording media unit for suitable execution of temperature detection and monitoring control without hampering the processing of commands for writing and reading data to and from the recording media. Another obvious benefit of the embodiments of the invention is a reduction in manufacturing cost thanks to the discontinued utilization of a temperature sensor attached externally to the recording media unit.

BRIEF DESCRIPTION OF THE DRAWINGS

FIG. 6 is an operation sequence diagram showing how temperature measurements of an internal temperature sensor inside a hard disk drive unit are acquired;

FIG. 7 is a tabular view permitting an easy understanding of how a temperature status determination manager determines temperature status of the hard disk drive based on acquired temperature information;

DETAILED DESCRIPTION OF THE PREFERRED EMBODIMENTS

Figure 1:
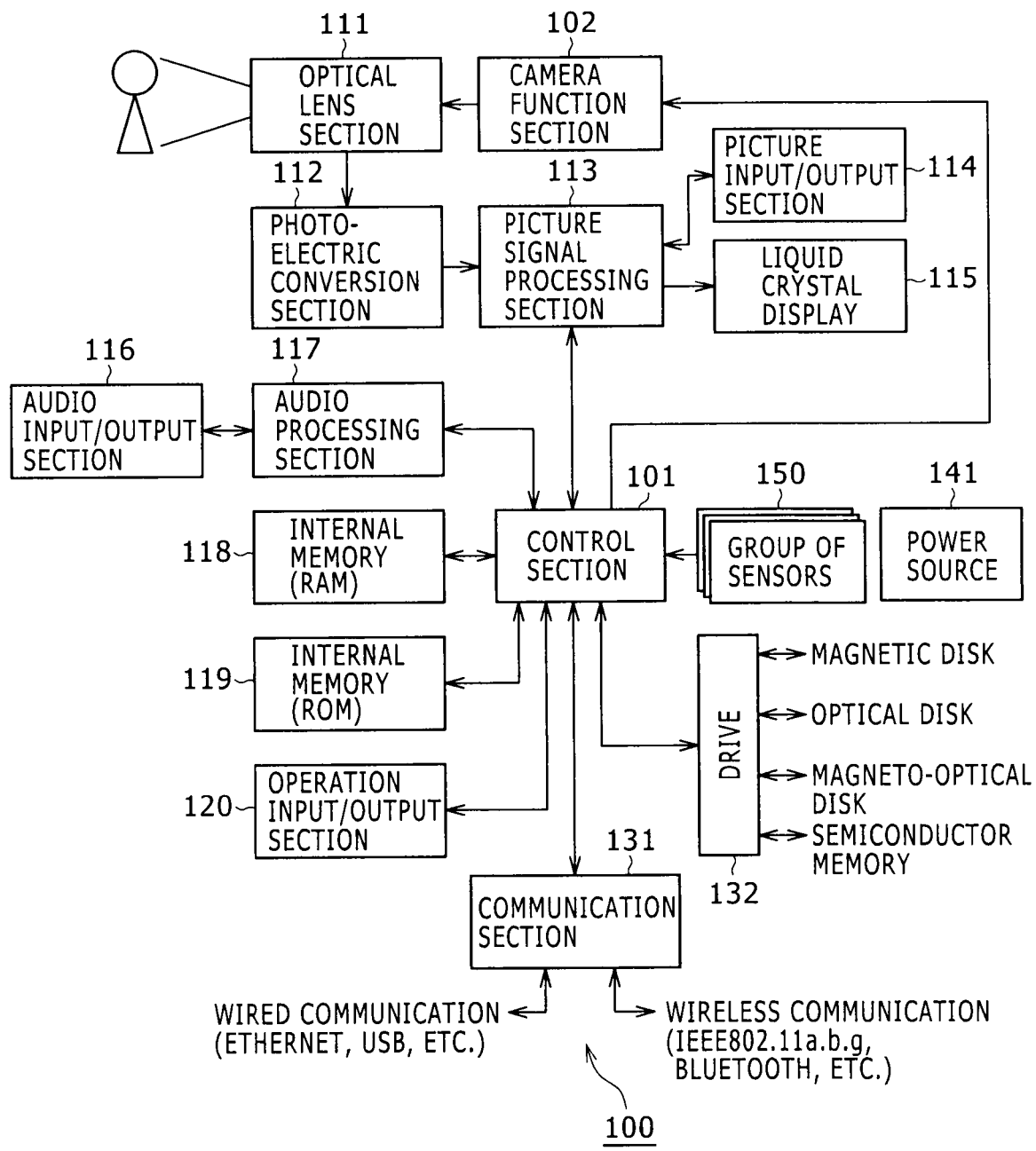
FIG. 1 is a schematic view showing a structure of a digital video camera.

The preferred embodiments of the present invention will now be described in detail with reference to the accompanying drawings. FIG. 1 schematically shows a structure of a digital video camera 100 constituting an example of apparatus acting as a recording media control apparatus which embodies the present invention incorporating a recording media unit.

The digital video camera 100 in FIG. 1 includes an optical lens section 111, a photoelectric conversion section 112, a camera function control section 102, a picture signal processing section 113, a picture input/output section 114, a liquid crystal display (finder) 115, an audio input/output section 116, an audio signal processing section 117, a communication section 131, a control section 101, an internal memory (RAM) 118, an internal memory (ROM) 119, an operation input section 120, a drive 132 for driving recording media, a group of sensors 150 including GPS (global positioning system) and an acceleration sensor, and a power source 141 for supplying power to the above-mentioned components of the camera. Of these components, the acceleration sensor may be of the type that incorporates a temperature sensor. Although the group of sensors 150 may include the temperature sensor, such a structure is not essential to the embodiments of the present invention.

The control section 101, typically composed of a CPU (central processing unit), performs processes in accordance with diverse processing programs held in the ROM (read only memory) 119. The RAM (random access memory) 118 is used primarily as a work area in which to accommodate temporarily the results of various processes.

The operation input section 120 is furnished with various operation keys and function keys including a mode change key for changing from one operation mode to another (e.g., moving picture taking mode, still picture taking mode, VTR mode), a shutter key for taking still pictures; and a picture-taking start key, a recording key, a reproduction key, a stop key, a fast forward key, and a rewind key for taking moving pictures. Upon receipt of an operation input from the user, the operation input section 120 supplies the control section 101 with an electrical signal corresponding to the received operation input.

Given the operation input from the user, the control section 101 reads from the ROM 119 the program for executing the processes relevant to the user's operation and carries out the retrieved program for control over the components of the camera. In this manner, the control section 101 controls the processes in response to the user's instructions.

Any of diverse recording media units such as a magnetic disk unit, an optical disk unit, a magneto-optical disk unit or a semiconductor memory unit may be attached to the digital video camera 100 as the drive 132. Illustratively, the drive 132 may be connected to the digital video camera 100 through a general host interface such as ATA (AT Attachment). The digital video camera 100 acting as the host issues a data write command via the host interface to the recording media unit so as to record information to the recording media therein and a data read command to the unit in order to reproduce information from the recording media.

If the recording media unit is a hard disk drive, the recording area of its recording media is managed by a file system such as FAT (file allocation table). Through the file system, upper-layer programs such as applications and the operating system can gain access to the recording area of the recording media. The hard disk drive is also controlled in its drive performance by a dedicated device driver. The file system issues to the device driver such host commands as a write command, a read command, and a temperature acquisition command (to be discussed later) for acquiring temperature measurements from an internal temperature sensor inside the unit.

This embodiment contains an internal temperature sensor (not shown) placed inside the hard disk drive serving as the recording media unit. The digital video camera 100 acting as the host may transmit a temperature acquisition command via the host interface to the hard disk drive and acquire temperature information measured by the internal temperature sensor as a return value.

The hard disk drive acting as the recording media unit of this embodiment has a cache that temporarily accommodates write and read data. The hard disk drive has the capability to store write data temporarily in the cache upon receipt of a data write command. In response to a flash cache command, the hard disk drive is capable of writing the data from the cache to the recording media, thereby completing the write process. The scheme by which to complete the writing of data to the recording media in response to a flash cache command is disclosed illustratively in Japanese Patent Laid-open No. 2007-59014 assigned previously to this applicant.

The digital video camera 100 illustratively has a picture-taking mode and a VTR mode. In the picture-taking mode, the digital video camera 100 records picture data acquired by taking pictures to the recording media such as a magnetic disk, an optical disk or a semiconductor memory (e.g., Memory Stick (registered trademark)) by way of the drive 132. In the VTR mode, the digital video camera 100 records to the recording media the data supplied from the picture input/output section 114 and audio input/output section 116 or through the communication section 131, and reproduces data from the recording media.

The picture-taking mode subsumes a moving picture-taking mode and a still picture-taking mode. In the moving picture-taking mode, moving pictures are taken and recorded to the recording media together with the sounds being picked up simultaneously. In the still picture-taking mode, still pictures are taken. In the VTR mode, supplied data is recorded by operation of the operation input section 120 made up of the recording button and other switches. Also in the VTR mode, the target data recorded on the recording media is reproduced therefrom by operation of the reproduction button and other switches on the operation input section 120.

Figure 2:
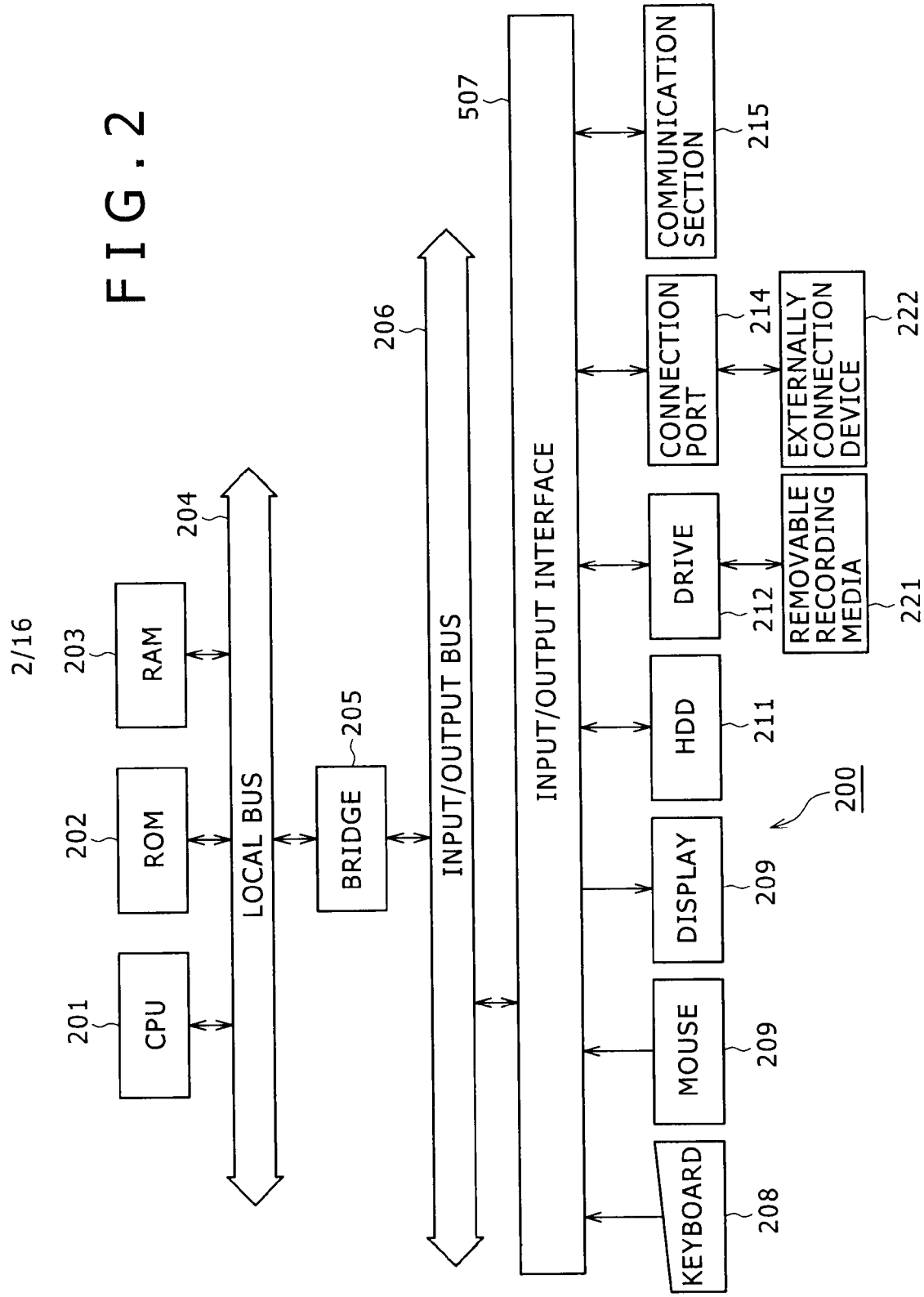
FIG. 2 is a schematic view showing a structure of a personal computer.

FIG. 2 schematically shows a structure of a personal computer 200 constituting another example of apparatus acting as the recording media control apparatus embodying the present invention.

A CPU 201 of the personal computer 200 executes programs held in the ROM 201 or on the hard disk drive 211 in a program execution environment offered by an operating system (OS).

A ROM (read only memory) 202 permanently stores such program codes as POST (Power On Self Test) and BIOS (Basic Input Output System). A RAM (203) is used as an area into which the CPU 201 loads programs from the ROM 202 or from the HDD 211 for program execution, or utilized as an area where the work data of the currently executing program is being held temporarily. These components are interconnected with one another via a local bus 204 connected directly to the local pins of the CPU 201.

The local bus 204 is connected to an input/output bus 206 such as a PCI (Peripheral Component Interconnect) bus by way of a bridge 205.

A keyboard 208 and a pointing device 209 such as a mouse are input devices to be operated by the user. A display 210 typically composed of an LCD (liquid crystal display) or a CRT (cathode ray tube) displays diverse information in text and images.

The HDD 211 is a drive unit that incorporates and drives a hard disk. The hard disk is used to install the operating system, various applications, and other programs executed by the CPU 21. The hard disk is also used to store various local files including media files containing moving and still pictures as well as data files.

The HDD 211 is connected illustratively via a general host interface such as ATA (AT Attachment). The computer 200 acting as the host issues a data write command through the host interface to the HDD 211 for recording of information to the latter. The computer 200 also issues a data read command to the HDD 211 for reproduction of information therefrom.

The recording area of the HDD 211 is managed by the file system such as FAT. Upper-layer programs such as applications and the operating system can access the recording area inside the hard disk through the file system. The HDD 211 is also controlled in its drive performance by a dedicated device driver. The device driver issues such host commands as the above-mentioned write command and read command to the HDD 211.

With this embodiment, the HDD 211 contains an internal temperature sensor (not shown) placed inside the unit. The personal computer 200 acting as the host may transmit a temperature acquisition command via the host interface to the HDD 211 and acquire temperature information measured by the internal temperature sensor as a return value. The HDD 211 also has a cache that temporarily accommodates write and read data. The HDD 211 has the capability to store write data temporarily in the cache upon receipt of a data write command. In response to a flash cache command, the HDD 211 is capable of writing the data from the cache to the recording media, thereby completing the write process (also not shown).

A drive 212 reads data or programs from the loaded piece of removable recording media 221 such as a magnetic disk, an optical disk, a magneto-optical disk or a semiconductor memory (e.g., Memory Stick (registered trademark)). The drive 212 feeds the data or programs thus retrieved to the RAM 203 via an input/output interface 207, the input/output bus 206, bridge 205, and local bus 204.

A connection port 214 is used to attach an externally connected device 222. As such, the connection port 214 has a connection interface such as USB or IEEE 1394. The connection port 214 is connected to the CPU 201 through the interface 207, input/output bus 206, bridge 205, and local bus 204. A communication section 215 is connected to a network and conducts communications with an external information processing apparatus (not shown).

Figure 3:
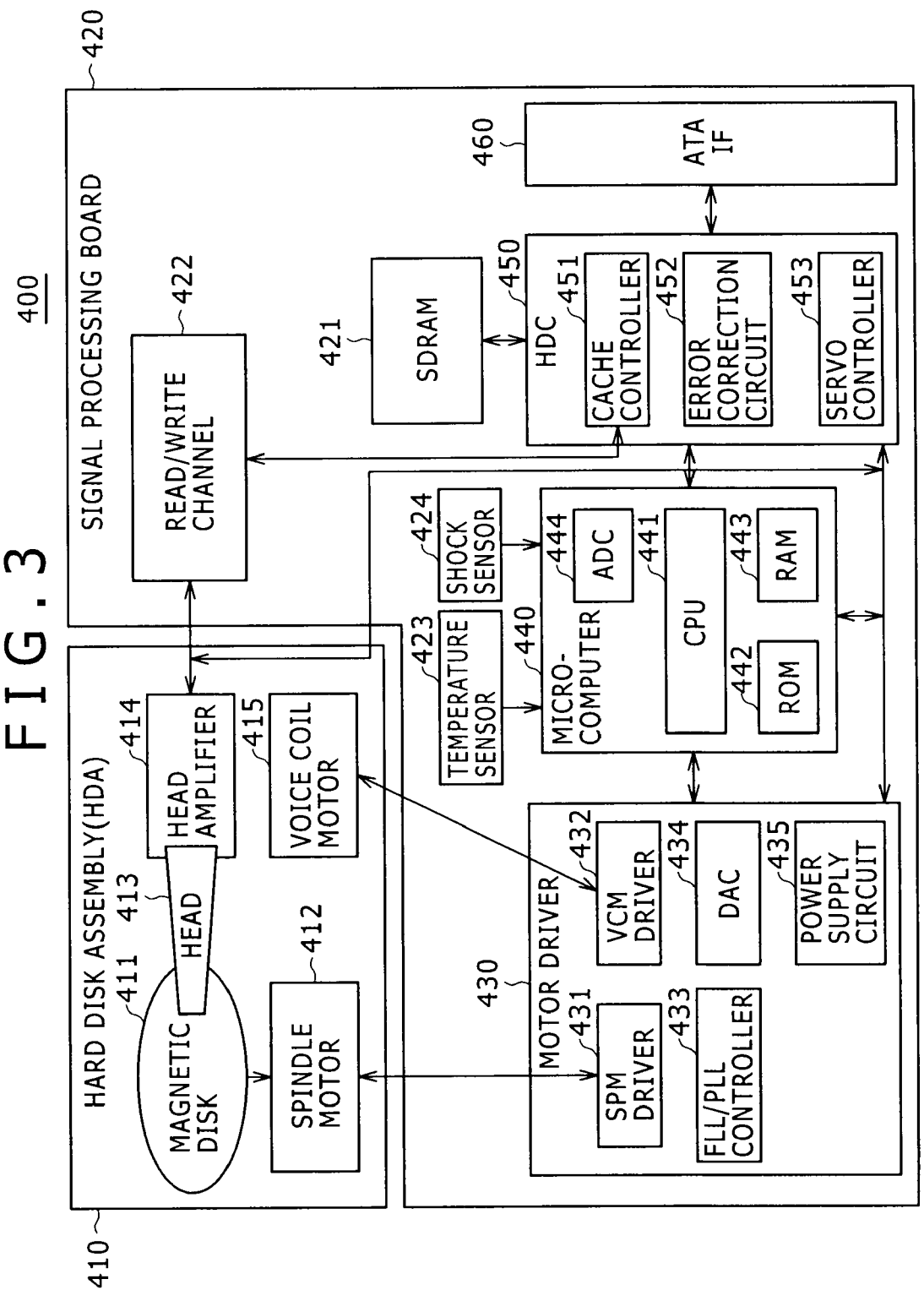
FIG. 3 is a schematic view showing a typical internal structure of a hard disk drive.

FIG. 3 schematically shows a typical internal structure of a hard disk drive 400 equivalent to the hard disk mounted on the digital video camera of FIG. 1 as the drive 132 or to the HDD 211 incorporated in the computer of FIG. 2. The hard disk drive 400 of FIG. 3 is made up of a hard disk assembly (HDA) 410 and a signal processing board 420.

The hard disk assembly 410 includes a magnetic disk 411 as recording media, a spindle motor 412 for rotating the magnetic disk 411, a head 413 for accessing the recording surface of the magnetic disk 411, a head amplifier 414 for inputting and outputting information signals to and from the head 413, and a voice coil motor 415 for driving the head 414 in the radial direction over the magnetic disk 411.

The signal processing board 420 carries on it circuit components including a motor driver 430, a microcomputer 440, a hard disk controller 450, and an ATA interface 460. The signal processing board 420 also carries an SDRAM (synchronous DRAM) 421 for use as a cache, a read/write channel 422, and internal sensors such as a temperature sensor 423 and a shock sensor 424.

The read/write channel 422 code-modulates write data bound for the magnetic disk 411 and outputs the modulated data to the head amplifier 413. Conversely, the read/write channel 422 detects data from the reproduced waveform (i.e., output signal from the header amplifier 413) retrieved from the magnetic disk 411 and subjects the detected data to code demodulation.

The hard disk controller 450 exchanges commands with the host through the ATA interface 450. The hard disk controller 450 includes a cache controller 451 that controls data cache operations using the SDRAM 421, an error correction circuit 452 that performs error correction on write and read data, and a servo controller 453 that provides servo control over the header 413 in its access position to the magnetic disk 411.

The microcomputer 440 includes a CPU 441, a ROM 442, and a RAM 443 as its basic components. Through an AD converter 444, the microcomputer 440 digitally admits output signals from such internal sensors as the temperature sensor 423 and shock sensor 424. With this embodiment, a temperature acquisition command is provided as an ATA command. Upon receipt of the temperature acquisition command, the hard disk controller 450 outputs as its return value information representing the temperature inside the unit detected by the temperature sensor 423.

The motor driver 430 has an SPM driver 431 for driving and controlling the spindle motor 412, and a VCM driver 432 for driving and controlling the voice coil motor 415. Given instruction signals from the server controller 453, the motor driver 430 causes the head 413 to do seek operations accordingly.

With this embodiment, the hard disk drive 400 has a flash cache capability. For example, when large quantities of data such as a moving picture stream are to be recorded, the hard disk controller 450 does not write data successively to the recording media every time a data write command is received via the ATA interface 460, but lets the cache controller 451 store the data temporarily into the cache 421. Upon receipt of a flash cache command issued periodically by the host, the cache controller 451 retrieves all write data held in the cache 421 and hands the retrieved data over to the read/write channel 422 for a collective write operation onto the magnetic disk 411.

Described below are the operations of the information apparatus such as the digital video camera 100 or personal computer 200 as it records and reproduces data to and from recording media through the use of the FAT file system. Although the recording media in the ensuing description are equivalent to the hard disk incorporated in the digital video camera of FIG. 1 as the drive 132 as well as to the HDD 211 contained in the computer of FIG. 2, it should be understood that the recording media include many other types of recording media which may be built into the FAT file system.

Figure 4:
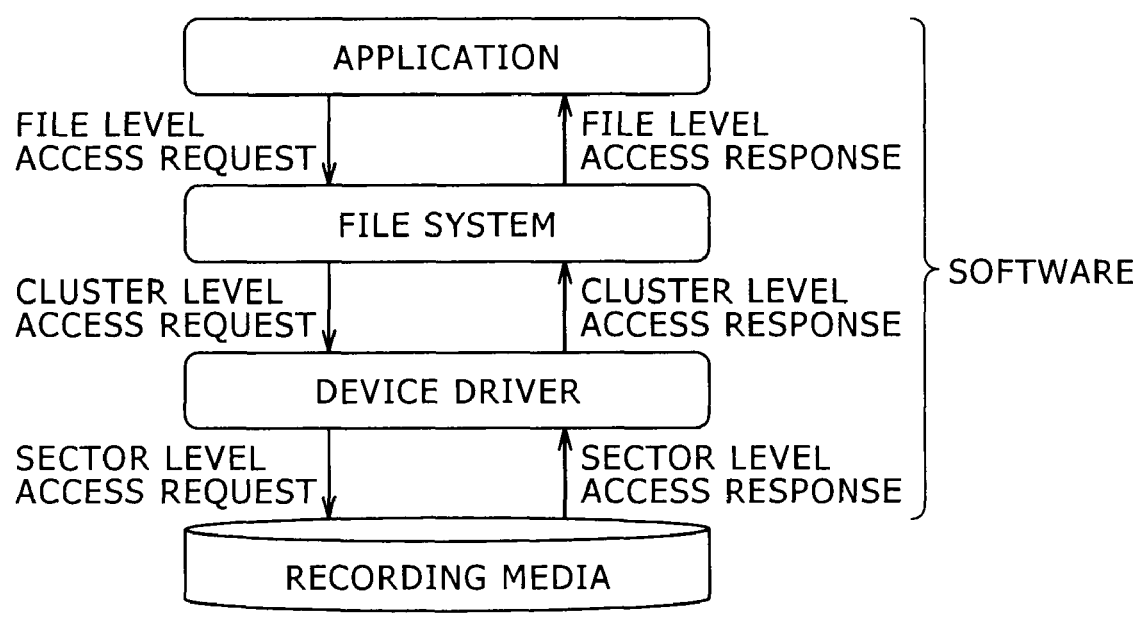
FIG. 4 is a schematic view showing a layered structure for writing and reading data to and from recording media upon access thereto.

The file system that manages the recording space of the recording media writes and reads data (as discussed above) by issuing host commands requesting write and read operations to the device driver assigned to each specific type of recording media such as the hard disk. FIG. 4 schematically shows a layered structure for writing and reading data to and from the recording media upon access thereto.

The application programs in the highest layer constitute a user interface (UI) that receives processing requests from, and returns the result of the processing to, the user. Immediately below the application program layer is the file system as a file management program that manages files on the recording media. Under the file system is a device driver layer that controls the recording media based on the information coming from the file system.

Between the application layer and the file system, access requests and responses are exchanged in units of files. Between the file system and the device driver, access requests and responses are exchanged in units of clusters. Between the device driver and the recording media, access requests and responses are exchanged in units of sectors. The applications, file system, and device driver are software programs to be executed by the control section 101 and CPU 201.

When data is to be recorded to or reproduced from the recording media, a request to perform the operation is issued illustratively through an application program past the file system to the device driver. The file system and device driver are thus activated in concert to write or read the data.

Figure 5:
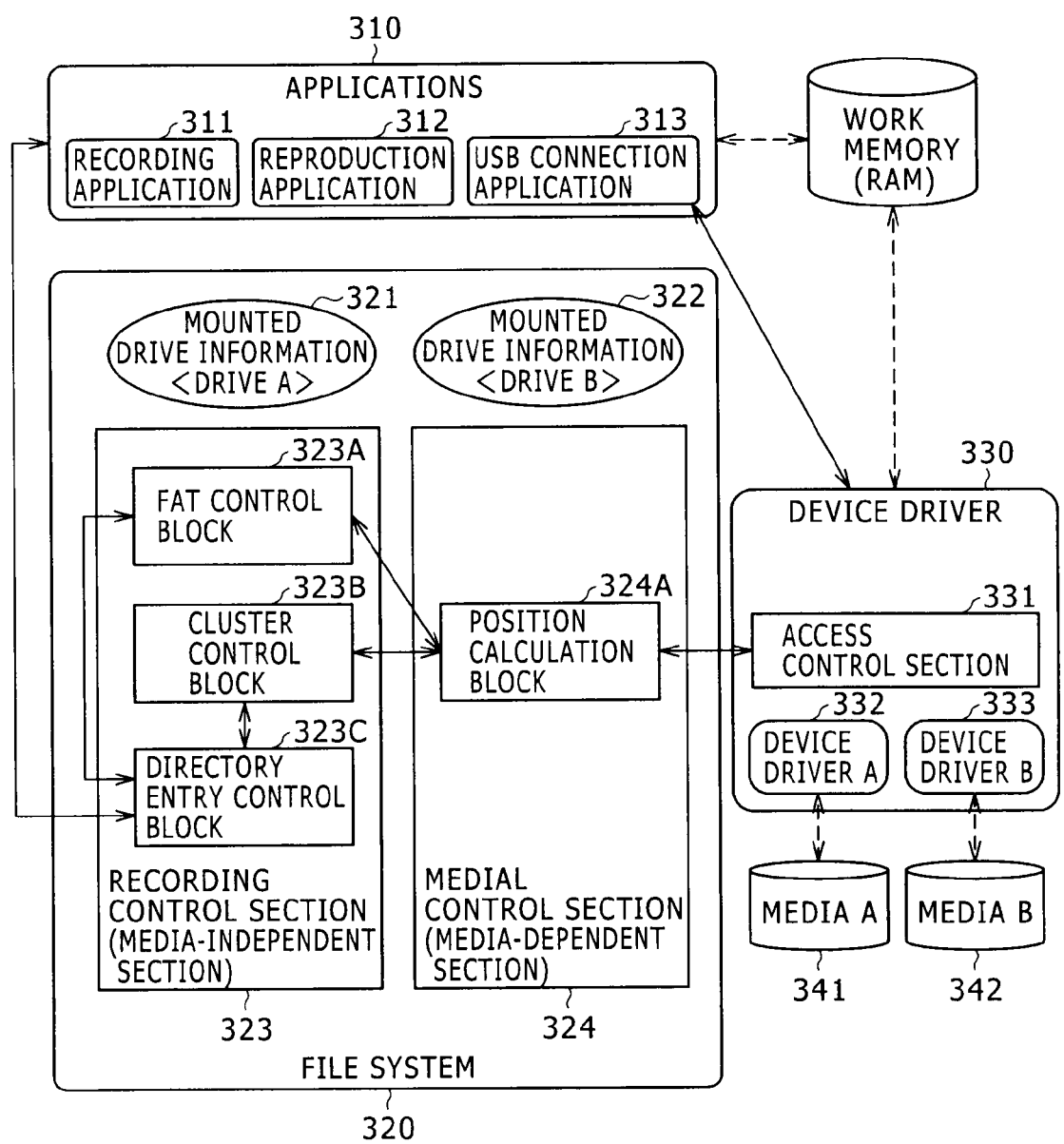
FIG. 5 is a schematic view detailing a file system included in the layered structure of FIG. 4.

FIG. 5 shows in more detail a file system 320 included in the layered structure of FIG. 4. In this example, there are provided two recording media A and B designated by reference numerals 341 and 342 respectively. Device drivers A332 and B333 subsumed under the device driver 330 are installed corresponding to the recording media A and B respectively.

A RAM 350 is utilized by applications 310, by the file system 320, and by the device driver 330 as a work area in which to accommodate programs, parameters and data needed for their respective processes.

Various processes are carried out by the applications 310 including a recording application 311 that records data to each of the mounted recording media, a reproduction application 312 that reproduces data from each of the recording media, and a USB connection application 313 that performs processes involving connected devices. The user selects any of these applications 311 through 313 for execution of diverse processing. The recording application 311 and reproduction application 312 each access the device driver 330 via the file system, whereas the USB connection application 313 gains direct access to the device driver 330.

The file system 320 holds mounted drive information 321 and 322 which includes the types of the corresponding recording media and their format information. In accordance with the mounted drive information, the file system 320 performs data recording and reproduction control over the recording media such as the hard disk. The file system 320 has a recording/reproduction control section 323 that controls data recording and reproduction and a media control section 324 that executes media control. The recording/reproduction control section 323 performs media-independent processes that are common to different media, and the media control section 324 carries out media-dependent processes.

The recording/reproduction control section 323 includes an FAT control block 323A that performs the recording of and references to a file allocation table (FAT), a cluster control block 323B that performs the process of determining the cluster constituting data recording position information and the process of determining the reproduction position based on the cluster number, and a directory entry control block 323C that generates or references directory entries (to be discussed later) containing information corresponding to files. The directory entry control block 323C acquires a directory entry corresponding to a particular file based on storage means and file designation information provided by the applications 310. Illustratively, when a file is to be reproduced, the directory entry control block 323C acquires the first cluster number from the directory entry and supplies the acquired number to the cluster control block 323B.

The media control section 324 has a position calculation block 324A. Based on the cluster information determined by the cluster control block 323B and on cluster chain information derived from the FAT, the position calculation block 324A determines that access position on the recording media to or from which to write or read data as per the cluster number. With the position information thus determined, the device driver 330 is controlled accordingly to let data be written to or read from the recording media of interest.

As described above, the recording media unit is susceptible to the effects of temperature fluctuations and thus needs to be controlled in recording and reproduction under protection from the environment of high and low temperatures. With this embodiment, as shown in FIG. 3, the hard disk drive has the internal temperature sensor 423 that permits accurate acquisition of the temperature inside the drive unit. The host such as the digital video camera 100 or personal computer 100 equipped with a hard disk drive issues a temperature acquisition request command to the hard disk drive and, given a return value therefrom, performs temperature detection and monitoring control accordingly.

If it did not make a temperature acquisition request in an appropriately timed manner, the host would run the risk of being late in writing or reading data to or from the recording media, or of failing to keep track of and counter temperature fluctuations.

Thus a first characteristic of this embodiment is that the host controls the cycle in which to transmit the temperature acquisition command to the hard disk drive in keeping with the current temperature state of the recording media. In this manner, the host processes the data read and data write commands efficiently while adapting to the temperature environment.

A second characteristic of this embodiment is that the host controls when to issue the temperature acquisition command to the hard disk drive in accordance with the status of data write and data read operations on the hard disk drive. In this manner, the host efficiently processes the commands for writing and reading data to and from the recording media.

Described below is the first characteristic of the sequence in which the host requests temperature acquisition from the hard disk drive.

The control section 101 or CPU 201 executes a temperature status determination manager as one of the programs constituting the upper-layer software. The temperature status determination manager is a program that acquires the internal temperature of the hard disk drive so as to determine the temperature status of that drive. Illustratively, the temperature status determination manager is a system-resident program operating continuously as long as the hard disk drive is in operation. The hard disk drive is monitored and controlled in accordance with the temperature status determined by the temperature status determination manager. However, the monitoring process is irrelevant to the embodiments of the present invention and thus will not be discussed further.

FIG. 6 gives an operation sequence diagram showing how temperature measurements of the internal temperature sensor inside the hard disk drive unit are acquired. A temperature acquisition cycle will now be described below by referring to FIG. 6.

The temperature status determination manager belongs to upper-layer software and does not by itself access the hard disk drive. Instead, it is through the device driver that the temperature status determination manager acquires temperature information measured by the internal temperature sensor.

More specifically, the temperature status determination manager sets a temperature acquisition request flag to the device driver periodically in predetermined fashion. Upon detecting the flag being set, the device driver transmits a temperature acquisition command to the hard disk driver and, given a return value therefrom, hands it over to the temperature status determination manager. The device driver then resets the flag.

By controlling the cycle in which to set the flag as described, the temperature status determination manager can control the cycle in which to request temperature acquisition.

Figure 8:
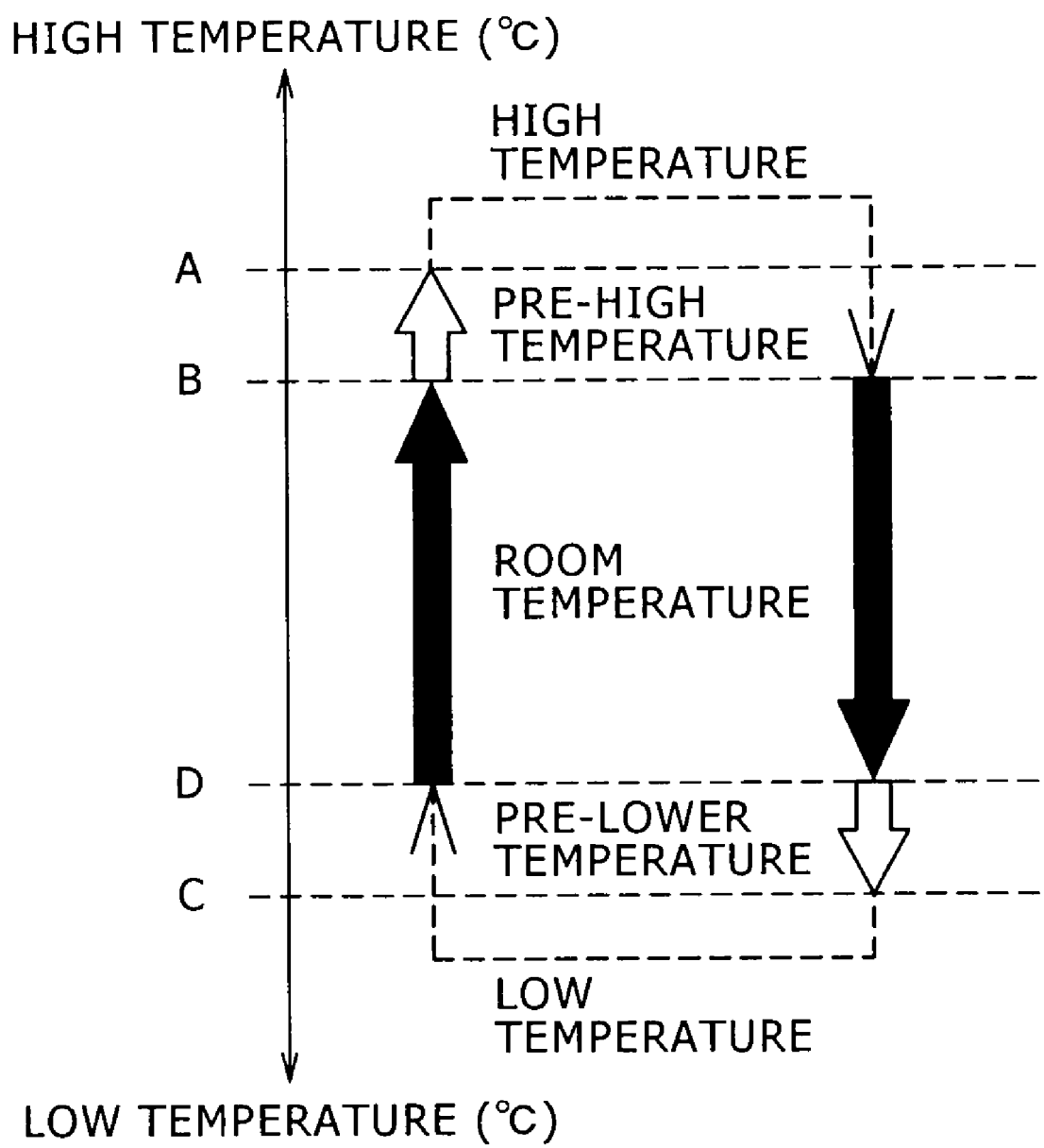
FIG. 8 is a schematic view showing a temperature status determination cycle.

FIG. 7 is a tabular view permitting an easy understanding of how the temperature status determination manager determines temperature status of the hard disk drive based on acquired temperature information. FIG. 8 schematically shows a temperature status determination cycle.

As illustrated, five temperature states are defined: a room temperature state, a high temperature state, a low temperature state, a pre-high temperature state that comes between the room temperature state and the high temperature state, and a pre-low temperature state that intervenes between the room temperature state and the low temperature state.

In keeping with the temperature state it has determined, the temperature status determination manager controls the cycle in which to request temperature acquisition from the hard disk drive. The table below shows typical cycles in which to request temperature acquisition in the different temperature states.

TABLE 1

| Temperature State | Temperature Acquisition Request Cycle |
| --- | --- |
| High temperature state | 5 seconds |
| Pre-high temperature state | 20 seconds |
| Room temperature state | 60 seconds |
| Pre-low temperature state | 20 seconds |
| Low temperature state | 5 seconds |

In the above example, the temperature status determination manager in the room temperature state sets the flag to the device driver in the longest cycle of 60 seconds. In the high temperature state or low temperature state, the temperature status determination manager sets the flag in the shortest cycle of 5 seconds. In the pre-high temperature state or pre-low temperature state, the temperature status determination manager sets the flag for requesting temperature acquisition in a cycle of 20 seconds Meanwhile, the process between the transition of the recording media from the room temperature state to the high or low temperature state on the one hand, and the transition from the high or low temperature state to the room temperature state on the other hand, is not reversible. Once the high or low temperature state is reached, hysteresis is considered to intervene before the recording media return to the initial state. Thus the temperature status determination manager determines temperature status by considering the hysteresis effect, whereby the control of temperature detection and monitoring is carried out more appropriately.

Described below in reference to FIGS. 7 and 8 is a typical temperature status determination cycle followed by the temperature status determination manager while taking the effects of hysteresis into consideration.

Upon temperature rise from the room temperature state, the temperature status determination manager effects transition to the pre-high temperature state when the temperature exceeds a pre-high temperature threshold value (B) and to the high temperature state when the temperature exceeds a high temperature threshold value (A). Upon temperature drop from the high temperature state back to the room temperature state, the temperature status determination manager stays in the high temperature state even when the temperature falls below the high temperature threshold value (A) and returns to the room temperature state when the temperature drops below the pre-high temperature threshold value (B). That is, once it effects transition to the high temperature state, the temperature status determination manager maintains the shortest cycle of 5 seconds in which to request temperature acquisition until the temperature drops to the room temperature state past the pre-high temperature threshold value (B), whereby ambient temperature fluctuations are more rigorously monitored.

Upon temperature drop from the room temperature state, the temperature status determination manager effects transition to the pre-high temperature state when the temperature drops below a pre-low temperature threshold value (D) and to the low temperature state when the temperature drops below a low temperature threshold value (C). Upon temperature rise from the low temperature state back to the room temperature state, the temperature status determination manager stays in the low temperature state even when the temperature exceeds the low temperature threshold value (C) and returns to the room temperature state when the temperature exceeds the pre-low temperature threshold value (D). That is, once it effects transition to the low temperature state, the temperature status determination manager maintains the shortest cycle of 5 seconds in which to request temperature acquisition until the temperature rises to the room temperature state past the pre-low temperature threshold value (D), whereby ambient temperature fluctuations are more rigorously monitored.

When the cycle in which to request temperature acquisition is controlled by the temperature status determination manager in accordance with temperature status as described above, it is possible to reduce the risk of lowering the rate at which to write or read data to or from the hard disk drive.

Described below is the second characteristic of the sequence in which the host requests temperature acquisition from the hard disk drive.

The device driver controls when to transmit the temperature acquisition command in keeping with the state in which the data write or data read command issued by the file system (or by an upper-layer moving picture recording or reproduction application) to the hard disk drive is being processed. That is, as long as the data write or data read command is being processed, the device driver will not transmit the temperature acquisition command immediately upon recognition of a temperature acquisition request flag being set by the temperature status determination manager.

Figure 9:
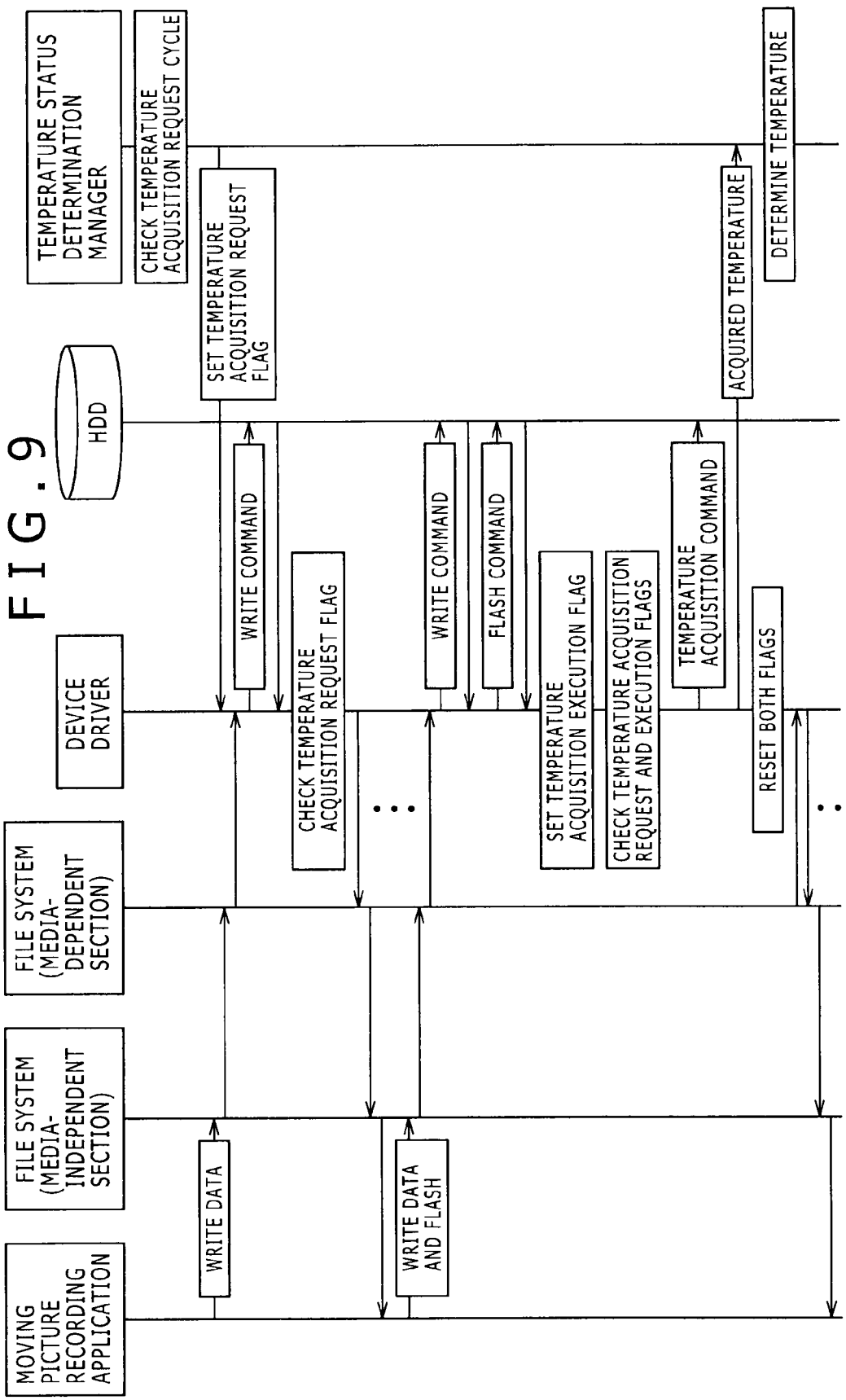
FIG. 9 is a typical operation sequence diagram showing how a temperature acquisition command is transmitted while a moving picture is being recorded to the hard disk drive.

FIG. 9 gives a typical operation sequence diagram showing how the temperature acquisition command is transmitted while a moving picture is being recorded to the hard disk drive. For the example of FIG. 9, it is assumed that the hard disk drive 400 provides a flash cache capability. That is, the hard disk drive 400 does not write data successively to the magnetic disk 411 every time a data write command is received but stores the data temporarily into the cache 421. Upon receipt of a flash cache command issued periodically by the device driver, the hard disk drive 400 writes the data from the cache 421 to the magnetic disk 411, thereby completing the series of write processes. Discussions about the flash cache are disclosed illustratively in Japanese Patent Laid-open No. 2007-59014 assigned previously to this applicant.

The device driver is assumed to have two flags: a temperature acquisition request flag to be set by the temperature status determination manager for requesting temperature acquisition, and a temperature acquisition execution flag to be set by the device driver itself upon execution of temperature acquisition.

Based on the currently held temperature status and on the above-described Table 1, the temperature status determination manager checks the cycle in which to request temperature acquisition and sets a relevant flag with regard to the cycle being in effect.

Meanwhile, the moving picture recording application is in operation. A data write request issued by this application is transferred to the device driver via the file system (media-independent and media-dependent sections).

In response to the data write request, the device driver transmits a data write command to the hard disk drive. The hard disk drive stores write data into the cache accordingly.

The device driver does not set the temperature acquisition execution flag even upon recognition of the temperature acquisition request flag set by the temperature status determination manager. That is, the device driver recognizes that it is not yet in a state to transmit the temperature acquisition command. The device driver thus refrains from issuing the temperature acquisition command while the data write command is being transmitted repeatedly.

The moving picture recording application periodically requests cache flash. In response to the flash request, the device driver transmits a flash cache command. Upon receipt of the flash cache command, the hard disk drive records all write data in the cache 421 collectively to the magnetic disk 411.

Thereafter, the device driver receives a response to the flash cache command from the hard disk drive and checks that the processing of this command has ended. The device driver then sets a temperature acquisition execution flag.

Having checked that both the temperature acquisition request flag and the temperature acquisition execution flag are set, the device driver recognizes that the temperature status determination manager is requesting temperature acquisition and that it is time for the device driver to transmit a temperature acquisition command. The device driver then transmits the temperature acquisition command to the hard disk drive and, given a return value therefrom, transfers that value to the temperature status determination manager. Thereafter, the device driver resets both the temperature acquisition request flag and the temperature acquisition execution flag.

The above-described operation sequence makes it possible to acquire temperature measurements from the recording media in an appropriate cycle while reducing the frequency with which to issue the temperature acquisition command during the recording of a moving picture to the hard disk drive.

Figure 10:
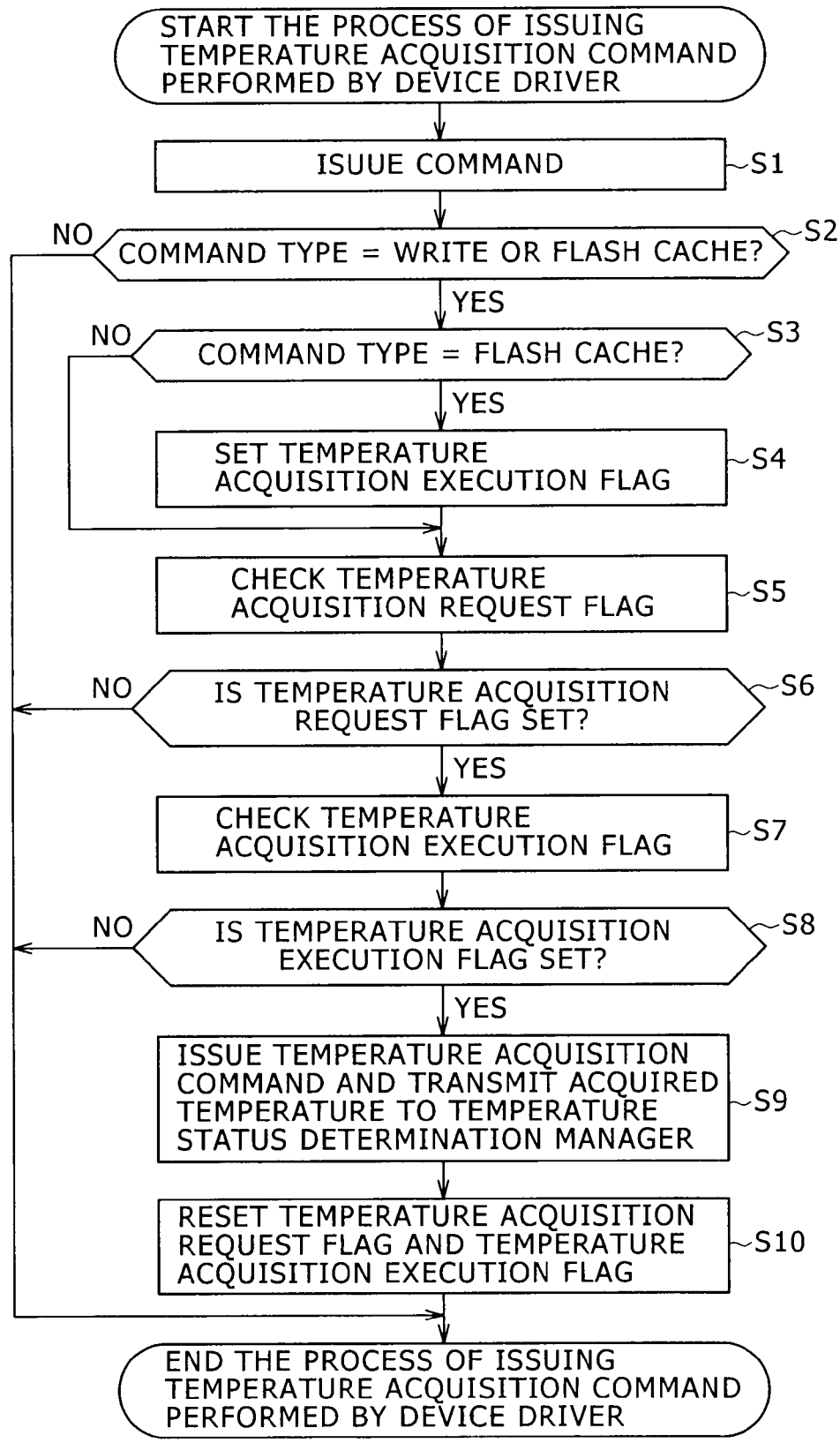
FIG. 10 is a flowchart showing the steps performed by a device driver in order to bring about the operation sequence illustrated in FIG. 9.

FIG. 10 is a flowchart showing the steps performed by the device driver in order to bring about the operation sequence illustrated in FIG. 9.

In step S1, the device driver issues a command to the hard disk drive. At that point, a check is made in step S2 to determine whether the command is a read command or a flash cache command.

If the command is found to be neither a read command nor a flash cache command ("No" in step S2), then the device driver skips all subsequent steps and terminates the process of issuing the temperature acquisition command.

If the command is found to be either a read command or a flash cache command ("Yes" in step S2), the device driver goes to step S3 and checks whether the command is a flash cache command. If the command is found to be a flash cache command ("Yes" in step S3), then the device driver goes to step S4 and sets a temperature acquisition execution flag.

In step S5, the device driver checks whether a temperature acquisition request flag is set. If the temperature acquisition request flag is not found to be set ("No" in step S6), then the device driver skips all subsequent steps and terminates the process of issuing the temperature acquisition command.

If the temperature acquisition request flag is found to be set ("Yes" in step S6), the device driver goes to step S7 and checks whether a temperature acquisition execution flag is also set.

If the temperature acquisition execution flag is not found to be set ("No" in step S8), then the device driver skips all subsequent steps and terminates the process of issuing the temperature acquisition command.

If the temperature acquisition execution flag is found to be set ("Yes" in step S8), the device driver goes to step S9, transmits a temperature acquisition command to the hard disk driver, and transfers the return value received therefrom to the temperature status determination manager.

The device driver then goes to step S10, resets both the temperature acquisition request flag and the temperature acquisition execution flag, and terminates this process.

Figure 11:
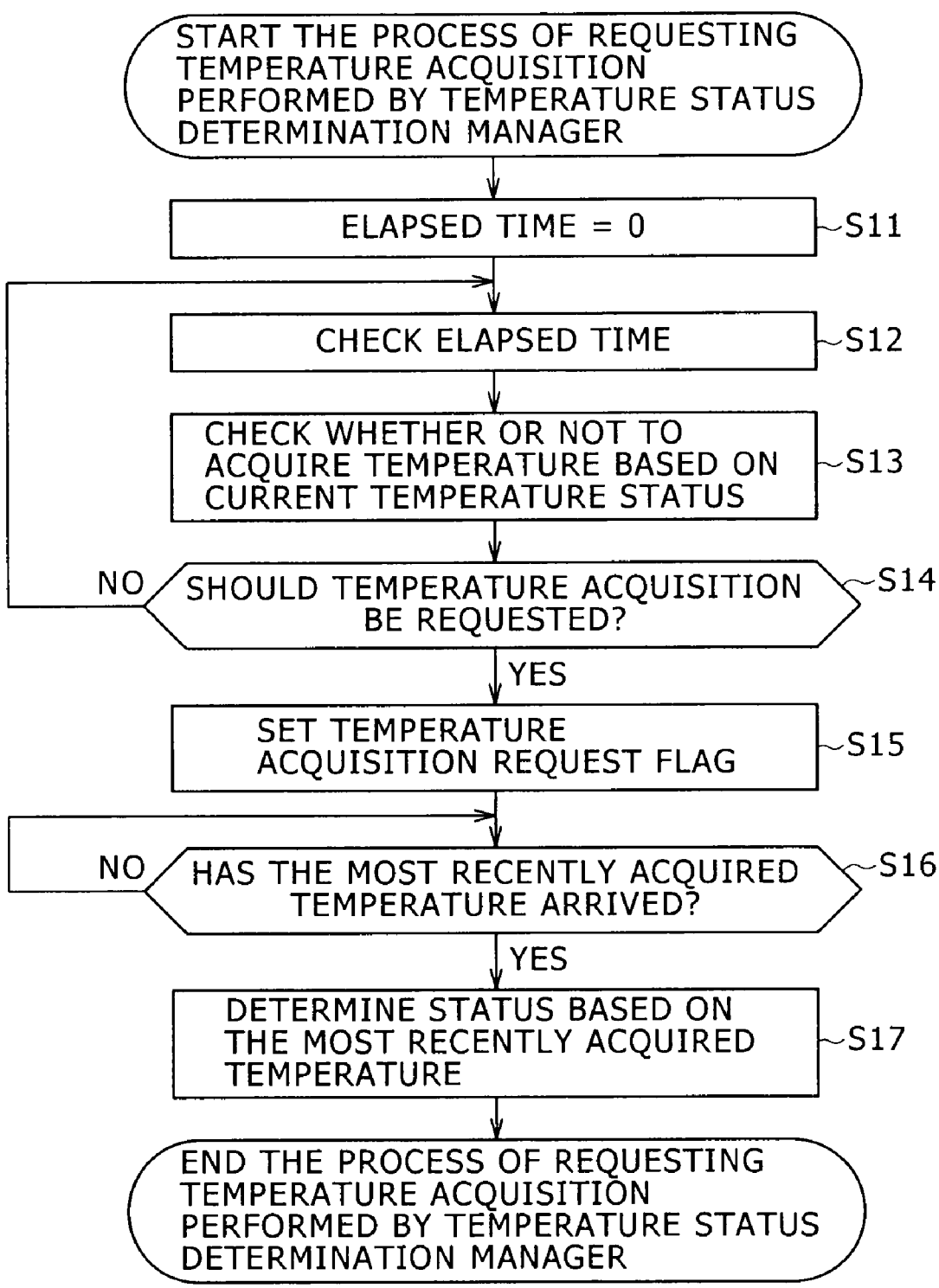
FIG. 11 is a flowchart showing the steps performed by the temperature status determination manager in order to bring about the operation sequence shown in FIG. 9.

FIG. 11 is a flowchart showing the steps performed by the temperature status determination manager in order to bring about the operation sequence shown in FIG. 9.

In step S11, the temperature status determination manager sets zero on the timer for measuring the elapsed time.

In step S12, the temperature status determination manager checks the elapsed time. Having obtained an appropriate cycle for requesting temperature acquisition based on the currently held temperature status and on the above-described Table 1 in step S13, the temperature status determination manager in step S14 checks whether or not to request temperature acquisition at this point in time. If the elapsed time is not found to be the time to request temperature acquisition ("No" in step S14), the temperature status determination manager returns to step S12 and waits for an appropriately elapsed time.

If the elapsed time is found to be the time to request temperature acquisition ("Yes" in step S14), the temperature status determination manager goes to step S15 and sets a temperature acquisition request flag to the device driver. In step S16, the temperature status determination manager waits for temperature information to arrive from the device driver.

Upon arrival of the most recent temperature information from the device driver ("Yes" in step S16), the temperature status determination manager goes to step S17, determines the temperature status in the hard disk drive, and terminates this process.

Figure 12:
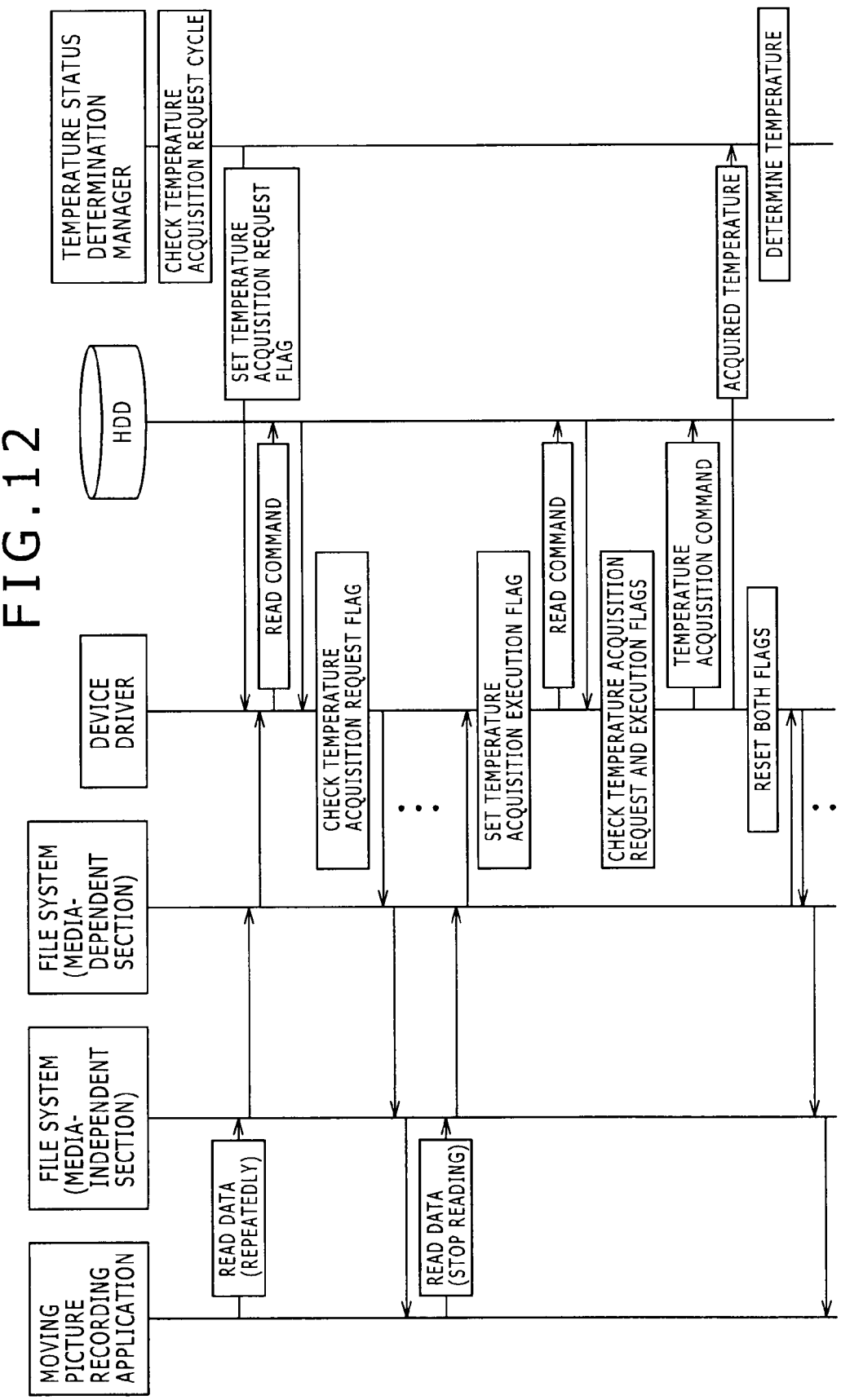
FIG. 12 is a typical operation sequence diagram showing how a temperature acquisition command is transmitted while a moving picture is being reproduced from the hard disk drive.

FIG. 12 gives a typical operation sequence diagram showing how a temperature acquisition command is transmitted while a moving picture is being reproduced from the hard disk drive. The device driver is assumed to have two flags (as mentioned above): a temperature acquisition request flag to be set by the temperature status determination manager for requesting temperature acquisition, and a temperature acquisition execution flag to be set by the device driver itself upon execution of temperature acquisition.

Based on the currently held temperature status and on the above-described Table 1, the temperature status determination manager checks the cycle in which to request temperature acquisition and sets a relevant flag with regard to the cycle being in effect.

Meanwhile, the moving picture recording application is in operation. A data write request issued repeatedly by this application is transferred to the device driver via the file system (media-independent and media-dependent sections). In response to the data write request, the device driver transmits a data write command to the hard disk drive.

The device driver does not set the temperature acquisition execution flag even upon recognition of the temperature acquisition request flag set by the temperature status determination manager. That is, the device driver recognizes that it is not yet in a state to transmit the temperature acquisition command. The device driver thus refrains from issuing the temperature acquisition command while the data write command is being transmitted repeatedly (i.e., as long as the reading of data is not stopped).

Thereafter, when the moving picture reproduction application requests that the reading of data be stopped, the file system (media-dependent section) sets the temperature acquisition execution flag to the device driver.

Having checked that both the temperature acquisition request flag and the temperature acquisition execution flag are set, the device driver recognizes that the temperature status determination manager is requesting temperature acquisition and that it is time for the device driver to transmit a temperature acquisition command. The device driver then transmits the temperature acquisition command to the hard disk drive and, given a return value therefrom, transfers that value to the temperature status determination manager. Thereafter, the device driver resets both the temperature acquisition request flag and the temperature acquisition execution flag.

The above-described operation sequence makes it possible to acquire temperature measurements from the recording media in an appropriate cycle while reducing the frequency with which to issue the temperature acquisition command during the reproduction of a moving picture from the hard disk drive.

Figure 13:
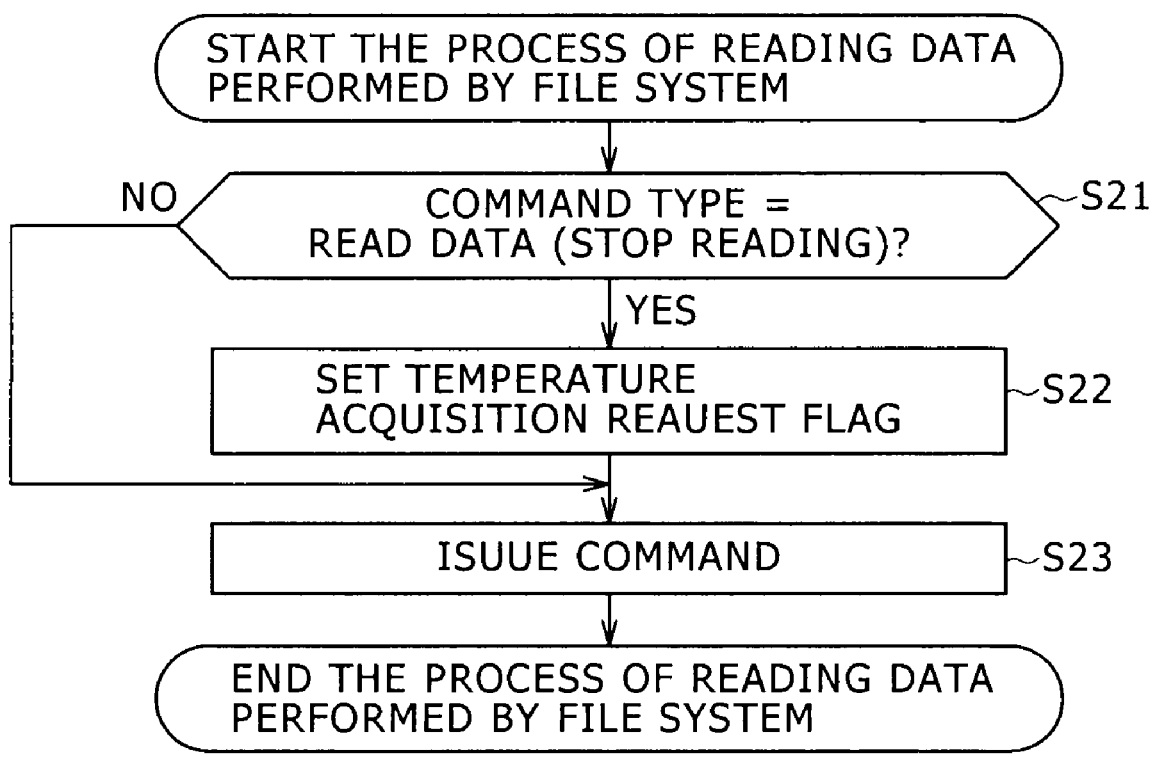
FIG. 13 is a flowchart showing the steps performed by the file system in order to bring about the operation sequence illustrated in FIG. 12.

FIG. 13 is a flowchart showing the steps performed by the file system (media-dependent section) in order to bring about the operation sequence illustrated in FIG. 12.

In step S21, the file system checks whether the command about to be issued to the device driver is a data read command or a read and stop command. If the result of the check in step S21 is affirmative, then the file system goes to step S22 and sets a temperature acquisition execution flag to the device driver. In step S23, regardless of the type of the command detected in step S21, the file system issues the command in question to the device driver. The file system then terminates this process.

Figure 14:
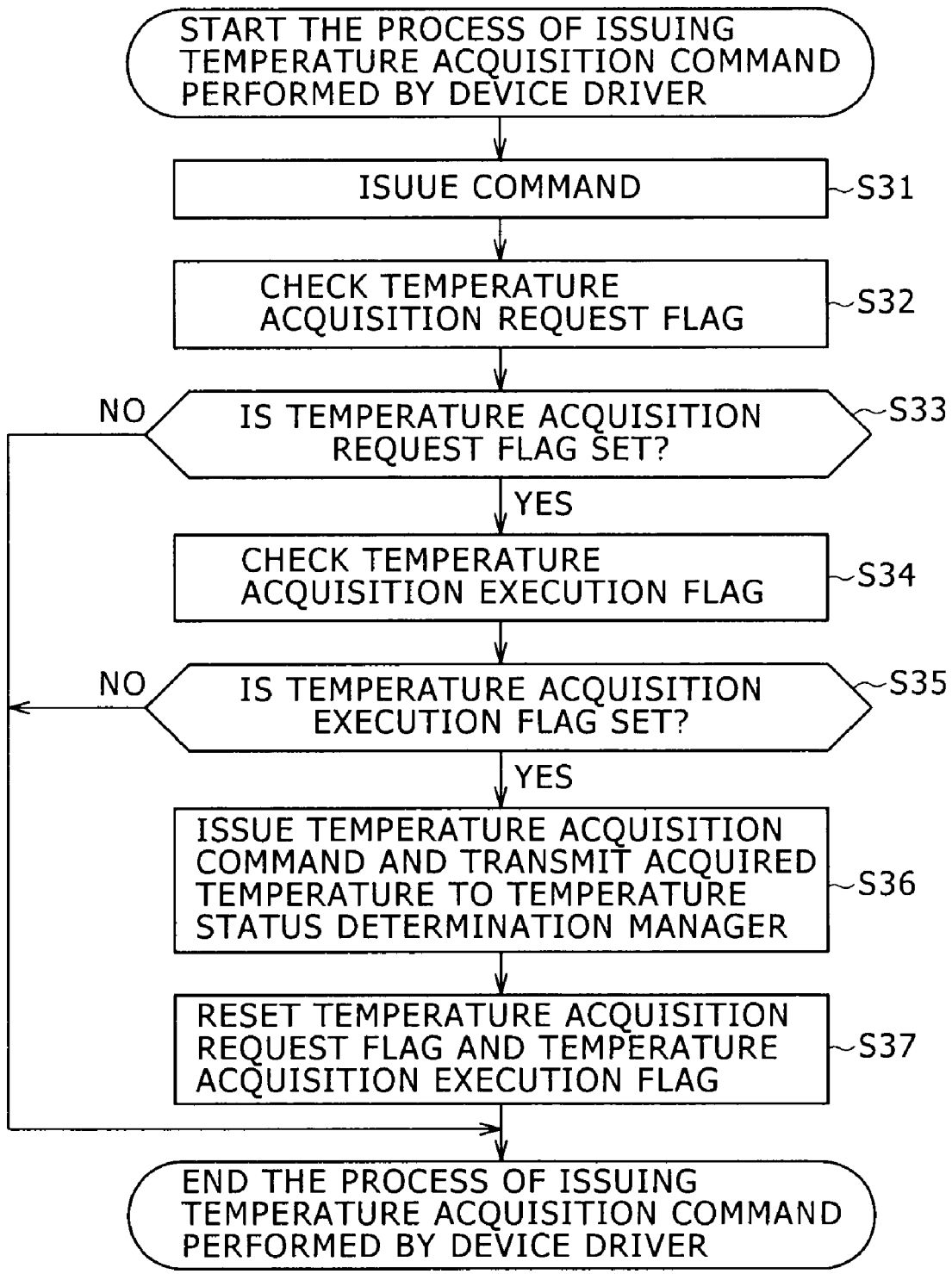
FIG. 14 is a flowchart showing the steps performed by the device driver in order to bring about the operation sequence illustrated in FIG. 12.

FIG. 14 is a flowchart showing the steps performed by the device driver in order to bring about the operation sequence illustrated in FIG. 12.

In step S31, the device driver issues a command to the hard disk drive. In step S32, the device driver checks whether a temperature acquisition request flag is set.

If the temperature acquisition request flag is not found to be set ("No" in step S33), then the device driver skips all subsequent steps and terminates the process of issuing the temperature acquisition command.

If the temperature acquisition request flag is found to be set ("Yes" in step S33), the device driver goes to step S34 and checks whether a temperature acquisition execution flag is also set.

If the temperature acquisition execution flag is not found to be set ("No" in step S35), then the device driver skips all subsequent steps and terminates the process of issuing the temperature acquisition command.

If the temperature acquisition execution flag is found to be set ("Yes" in step S35), the device driver goes to step S36, transmits a temperature acquisition command to the hard disk driver, and transfers the return value received therefrom to the temperature status determination manager.

The device driver then goes to step S37, resets both the temperature acquisition request flag and the temperature acquisition execution flag, and terminates this process.

Figure 15:
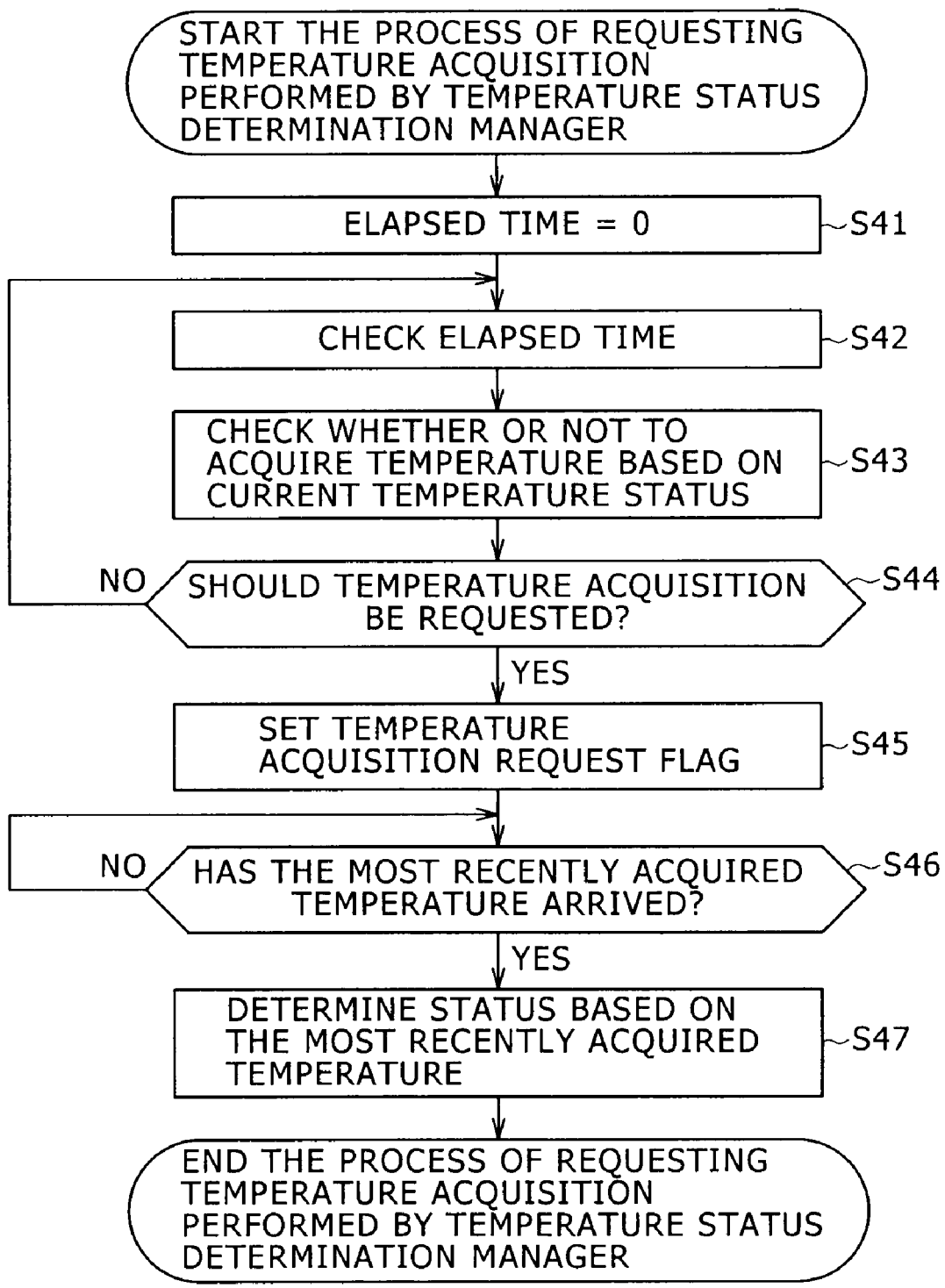
FIG. 15 is a flowchart showing the steps performed by the temperature status determination manager in order to bring about the operation sequence illustrated in FIG. 12.

FIG. 15 is a flowchart showing the steps performed by the temperature status determination manager in order to bring about the operation sequence illustrated in FIG. 12.

In step S41, the temperature status determination manager sets zero on the timer for measuring the elapsed time. In step S42, the temperature status determination manager checks the elapsed time. Having obtained an appropriate cycle for requesting temperature acquisition based on the currently held temperature status and on the above-described Table 1 in step S43, the temperature status determination manager in step S44 checks whether or not to request temperature acquisition at this point in time. If the elapsed time is not found to be the time to request temperature acquisition ("No" in step S44), the temperature status determination manager returns to step S42 and waits for an appropriately elapsed time.

If the elapsed time is found to be the time to request temperature acquisition ("Yes" in step S44), the temperature status determination manager goes to step S45 and sets a temperature acquisition request flag to the device driver. In step S46, the temperature status determination manager waits for temperature information to arrive from the device driver.

Upon arrival of the most recent temperature information from the device driver ("Yes" in step S46), the temperature status determination manager goes to step S47, determines the temperature status in the hard disk drive, and terminates this process.

The operation sequence for transmitting the temperature acquisition command while a moving picture is being recorded to the hard disk drive was explained above in reference to FIG. 9. The sequence makes it possible to acquire temperature measurements from the recording media in an appropriate cycle while reducing the frequency with which to issue the temperature acquisition command during the recording of large quantities of data such as a moving picture.

Another example in which large quantities of data are written to the hard disk drive is a full format process. The inventors are of the opinion that the temperature acquisition command needs to be transmitted in a suitably timed manner also during the full format process. That is because if the issuance of a temperature acquisition command intervenes during continuous data write operations of the full format process, the processing time will be prolonged by the time period required for the issuance of the command.

Figure 16:
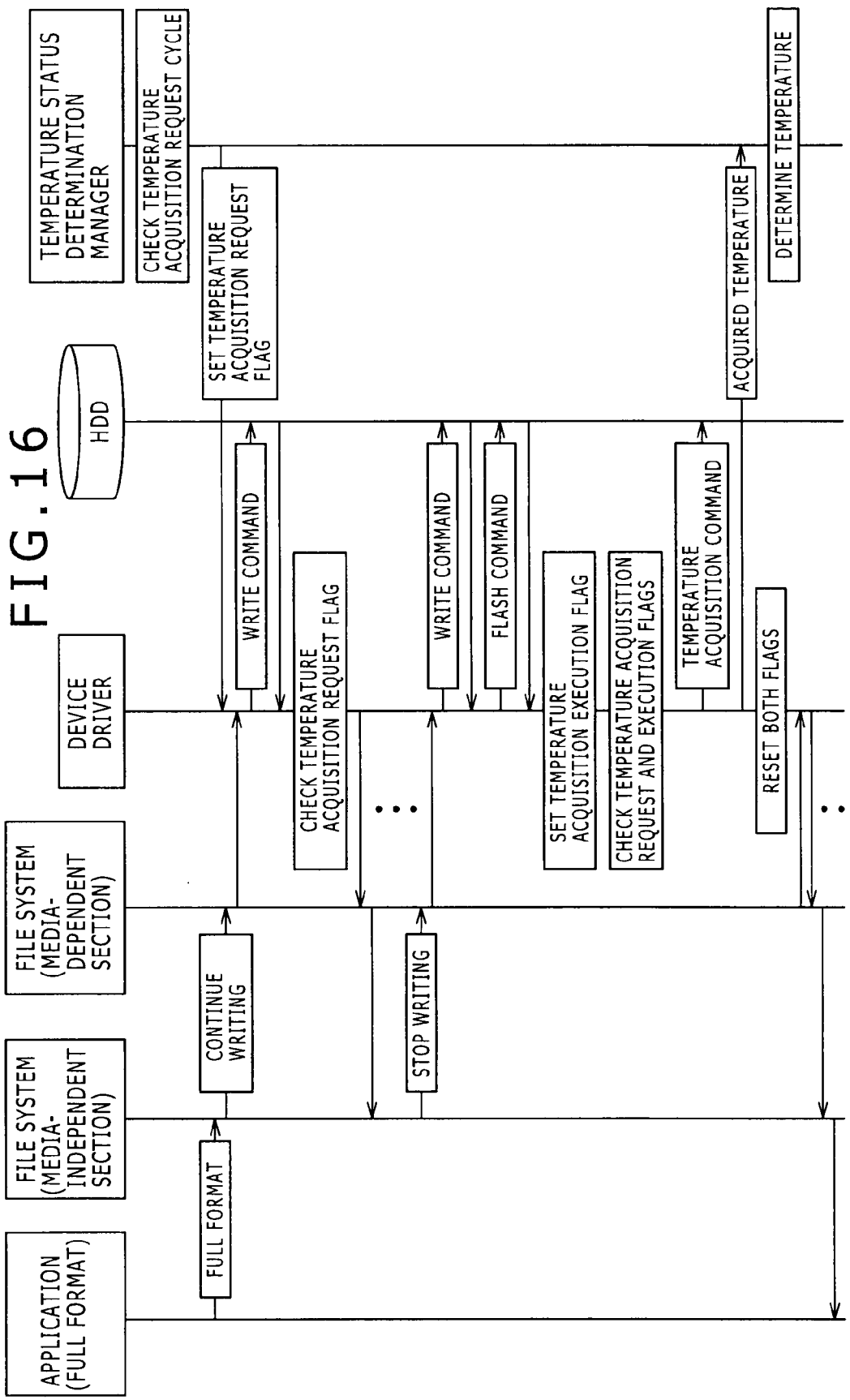
FIG. 16 is a typical operation sequence diagram showing how a temperature acquisition command is transmitted while a full format process is being carried out on the hard disk drive.

FIG. 16 is a typical operation sequence diagram showing how the temperature acquisition command is transmitted while the full format process is being carried out on the hard disk drive.

For the example of FIG. 16, the hard disk drive 400 is assumed to have a flash cache capability. That is, the hard disk drive 400 does not write data successively to the magnetic disk 411 every time a data write command is received but stores the data temporarily into the cache 421. Upon receipt of a flash cache command issued periodically by the device driver, the hard disk drive 400 writes the data from the cache 421 to the magnetic disk 411, thereby completing the series of write processes (as mentioned above). The device driver is assumed to have two flags (also mentioned above): a temperature acquisition request flag to be set by the temperature status determination manager for requesting temperature acquisition, and a temperature acquisition execution flag to be set by the device driver itself upon execution of temperature acquisition.

Based on the currently held temperature status and on the above-described Table 1, the temperature status determination manager checks the cycle in which to request temperature acquisition and sets a relevant flag with regard to the cycle being in effect. Meanwhile, an application requests the media-independent section of the file system to carry out a full format process. In response to the request, a continuous data write request destined for the media-dependent section of the file system is issued and transferred to the device driver.

In response to the data write request, the device driver issues a data write command to the hard disk drive. The hard disk drive stores write data temporarily into the cache.

The device driver does not set the temperature acquisition execution flag even upon recognition of the temperature acquisition request flag set by the temperature status determination manager. That is, the device driver recognizes that it is not yet in a state to transmit the temperature acquisition command. The device driver thus refrains from issuing the temperature acquisition command while the data write command is being transmitted repeatedly.

The media-independent section of the file system gives a notification that the writing of data for the full format process has ended. Given the end notification, the device driver transmits a flash cache command following the last data write command.

Upon receipt of the flash cache command, the hard disk drive records all write data in the cache 421 collectively to the magnetic disk 411.

Thereafter, the device driver receives a response to the flash cache command from the hard disk drive and checks that the processing of this command has ended. The device driver then sets a temperature acquisition execution flag.

Having checked that both the temperature acquisition request flag and the temperature acquisition execution flag are set, the device driver recognizes that the temperature status determination manager is requesting temperature acquisition and that it is time for the device driver to transmit a temperature acquisition command. The device driver then transmits the temperature acquisition command to the hard disk drive and, given a return value therefrom, transfers that value to the temperature status determination manager. Thereafter, the device driver resets both the temperature acquisition request flag and the temperature acquisition execution flag.

The above-described operation sequence makes it possible to reduce the number of times the temperature acquisition command is issued during the full format process on the hard disk drive, thereby minimizing the adverse effects of the issuance of that command on the time it takes to complete the full format process.

While some preferred embodiments of this invention have been described using specific terms, such description is for illustrative purposes only, and it is to be understood that changes and variations may be made by those skilled in the art without departing from the spirit or scope of the claims that follow.

For example, the embodiments of the present invention apply advantageously to digital video cameras, laptop computers, and other diverse kinds of portable information equipment incorporating the hard disk drive. However, such pieces of equipment are not limitative of the present invention.

Although the foregoing description has explained mainly the hard disk as the recording media, this is not limitative of the present invention. The embodiments of the present invention also apply to information equipment incorporating other kinds of recording media requiring protection from the environment of high and low temperatures. The recording media to be incorporated may be removably attached to the information equipment as long as they have an internal temperature sensor in the recording media unit and are connected to the information equipment via a host interface.

Thus the scope of the invention should be determined by the appended claims and their legal equivalents, rather than by the examples of the invention having been disclosed above.

The present application contains subject matter related to that disclosed in Japanese Priority Patent Application JP 2008-164058, filed in the Japan Patent Office on Jun. 24, 2008, the entire content of which is hereby incorporated by reference.

What is claimed is:

1. A recording media control apparatus comprising:
a host interface configured to connect recording media to a recording media unit, the recording media being subject to the writing and reading of data thereto and therefrom, the recording media unit incorporating an internal temperature sensor;
access request means for making either a data write request or a data read request to the recording media unit;
temperature status determination means for requesting temperature acquisition from the recording media unit in a predetermined cycle and, based on the acquired temperature, determining temperature status of the recording media, wherein the temperature status determination means controls the cycle in which to request temperature acquisition in accordance with the determined temperature status; and
access control means for transmitting a command to the recording media unit via the host interface in response to an access request from the access request means and the temperature acquisition request from the temperature status determination means.

2. The recording media control apparatus according to claim 1, based on the temperature acquired from the recording media unit, the temperature status determination means determine the recording media to be in one of five temperature states constituted by a room temperature state, a high temperature state, a low temperature state, a pre-high temperature state between the room temperature state and the high temperature state, and a pre-low temperature state between the room temperature state and the low temperature state, wherein,
if the recording media are found to be in the room temperature state, then the temperature status determination means select a first cycle as the longest cycle in which to request temperature acquisition,
if the recording media are found to have effected transition to either the high temperature state or the low temperature state, then the temperature status determination means select a second cycle as the shortest cycle in which to request temperature acquisition; and
if the recording media are found to be in either the pre-high temperature state or the pre-low temperature state, then the temperature status determination means select a third cycle that comes between the first and the second cycles as the cycle in which to request temperature acquisition.

3. The recording media control apparatus according to claim 1, wherein,
in accordance with processing status of either a data write command or a data read command issued to the recording media unit based on the request from the access request means, the access control means control when to transmit a temperature acquisition command based on the request from the temperature status determination means.

4. The recording media control apparatus according to claim 3, the recording media unit includes a cache in which to store write data temporarily, and a capability of writing the data stored in the cache to the recording media; wherein
while the writing of data to the recording media unit is continuously processed, the access control means transmit the temperature acquisition command not at the end of the processing of the data write command from the access request means but upon completion of the processing of a flash cache command from the access request means.

5. The recording media control apparatus according to claim 4, wherein,
while the recording of a moving picture to the recording media unit is being processed, the access control means transmit the temperature acquisition command not at the end of the processing of the data write command from the access request means but upon completion of the processing of a flash cache command from the access request means.

6. The recording media control apparatus according to claim 4, wherein,
while a full format process is being performed on the recording media unit, the access control means transmit the temperature acquisition command not at the end of the processing of the data write command from the access request means but upon completion of the processing of a flash cache command from the access request means.

7. A recording media controlling method for use with a computer connecting recording media via a host interface to a recording media unit incorporating an internal temperature sensor, the recording media controlling method controlling data write and data read operations on the recording media unit in accordance with temperature status thereof, the recording media controlling method comprising:
causing the computer to make either a data write request or a data read request to the recording media unit;
causing the computer to request temperature acquisition from the recording media unit in a predetermined cycle and, based on the acquired temperature, to determine temperature status of the recording media, wherein the cycle in which to request temperature acquisition is controlled in accordance with the determined temperature status; and
causing the computer to transmit a command to the recording media unit via the host interface in response to an access request and the temperature acquisition request.

8. A non-transitory computer-readable medium including a computer program described in a computer-readable format for execution by a computer connecting recording media via a host interface to a recording media unit incorporating an internal temperature sensor, the computer program causing the computer to perform data write and data read operations on the recording media unit in accordance with temperature status thereof, the computer program causing the computer to function with capabilities including:
making either a data write request or a data read request to the recording media unit;
requesting temperature acquisition from the recording media unit in a predetermined cycle and, based on the acquired temperature, determining temperature status of the recording media, wherein the cycle in which to request temperature acquisition is controlled in accordance with the determined temperature status; and
transmitting a command to the recording media unit via the host interface in response to an access request and the temperature acquisition request.

9. A recording media control apparatus comprising:
a host interface configured to connect recording media to a recording media unit, the recording media being subject to the writing and reading of data thereto and therefrom, the recording media unit incorporating an internal temperature sensor;
an access request section configured to make either a data write request or a data read request to the recording media unit;
a temperature status determination section configured to request temperature acquisition from the recording media unit in a predetermined cycle and, based on the acquired temperature, to determine temperature status of the recording media, wherein the temperature status determination section controls the cycle in which to request temperature acquisition in accordance with the determined temperature status; and
an access control section configured to transmit a command to the recording media unit via the host interface in response to an access request from the access request section and the temperature acquisition request from the temperature status determination section.

* * * * *